United States Patent
Ito et al.

(10) Patent No.: US 10,553,908 B2
(45) Date of Patent: Feb. 4, 2020

(54) METHOD OF MANUFACTURING A LAMINATED POWER STORAGE ELEMENT

(71) Applicant: FDK CORPORATION, Tokyo (JP)

(72) Inventors: Ryuji Ito, Tokyo (JP); Takayuki Kumagai, Tokyo (JP); Yuya Iida, Tokyo (JP); Daisuke Hirata, Tokyo (JP); Yasuaki Egawa, Tokyo (JP); Tsukasa Mano, Tokyo (JP); Yorinobu Murata, Tokyo (JP); Manabu Yasuno, Tokyo (JP); Go Taniyama, Tokyo (JP)

(73) Assignee: FDK Corporation, Tokyo (JP)

(*) Notice: Subject to any disclaimer, the term of this patent is extended or adjusted under 35 U.S.C. 154(b) by 127 days.

(21) Appl. No.: 15/645,413

(22) Filed: Jul. 10, 2017

(65) Prior Publication Data

US 2018/0019501 A1    Jan. 18, 2018

(30) Foreign Application Priority Data

Jul. 12, 2016 (JP) .................................. 2016-137458
Dec. 21, 2016 (JP) .................................. 2016-248005
Jan. 12, 2017 (JP) .................................. 2017-003509

(51) Int. Cl.
*H01M 10/0585* (2010.01)
*H01M 10/0525* (2010.01)
(Continued)

(52) U.S. Cl.
CPC ..... *H01M 10/0585* (2013.01); *H01M 2/0277* (2013.01); *H01M 2/0287* (2013.01);
(Continued)

(58) Field of Classification Search
CPC ............. H01M 2/0275; H01M 2/0277; H01M 2/0287; H01M 6/14; H01M 10/0525; H01M 10/0585; H01M 2220/30
(Continued)

(56) References Cited

U.S. PATENT DOCUMENTS

| | | | | |
|---|---|---|---|---|
| 2003/0054241 | A1* | 3/2003 | Yamashita | H01M 2/021 |
| | | | | 429/181 |
| 2007/0292753 | A1* | 12/2007 | Zama | H01M 2/0212 |
| | | | | 429/181 |
| 2009/0186270 | A1* | 7/2009 | Harada | H01M 2/0267 |
| | | | | 429/185 |

FOREIGN PATENT DOCUMENTS

| | | | | |
|---|---|---|---|---|
| JP | 11233133 | A | * | 8/1999 |
| JP | 2005228573 | A | * | 8/2005 |

(Continued)

OTHER PUBLICATIONS

J-PlatPat machine translation of the detailed description of JP-11233133-A. (Year: 1999).*

(Continued)

*Primary Examiner* — Gregg Cantelmo
(74) *Attorney, Agent, or Firm* — Greer Burns & Crain Ltd.

(57) ABSTRACT

A laminated power storage element includes: an exterior body shaped into a flat bag shape by laminating a pair of laminated films to weld a peripheral edge region; an electrode body sealed within the exterior body; a positive and a negative electrode terminal portion allowed to project outside the exterior body from a predetermined margin of the exterior body; and a pair of tab films welded on surfaces where the pair of laminated films oppose one another in a region along the predetermined margin to mutually weld the pair of laminated films, and the tab film covers an end surface of the laminated film while deviating outward from the exterior body from the predetermined margin, and covers both front and back surfaces of each of a base end of the positive electrode terminal portion and a base end of the negative electrode terminal portion.

2 Claims, 13 Drawing Sheets

(51) Int. Cl.
  *H01M 6/14* (2006.01)
  *H01M 2/02* (2006.01)
(52) U.S. Cl.
  CPC ......... *H01M 6/14* (2013.01); *H01M 10/0525* (2013.01); *H01M 2220/30* (2013.01)
(58) Field of Classification Search
  USPC ...................................................... 29/623.2
  See application file for complete search history.

(56) References Cited

FOREIGN PATENT DOCUMENTS

| JP | 2006-281613 A | 10/2006 |
| JP | 2008-192451 A | 8/2008 |

OTHER PUBLICATIONS

FDK Corporation, "Thin Type Primary Lithium Batteries," [online], Internet <URL:http://www.fdk.co.jp/battery/lithium/lithium_thin.html> (URL:http://www.fdk.com/battery/lithium_e/lithium_thin.html> in English.

* cited by examiner

METHOD OF MANUFACTURING A LAMINATED POWER STORAGE ELEMENT

CROSS-REFERENCE TO RELATED APPLICATIONS

The present application claims priority from Japanese Patent Application No. 2016-137458 filed on Jul. 12, 2016, Japanese Patent Application No. 2016-248005 filed on Dec. 21, 2016, and Japanese Patent Application No. 2017-003509 filed on Jan. 12, 2017, which are herein incorporated by reference.

BACKGROUND

Technical Field

The present disclosure relates to a laminate-type power storage element that houses a power generation element in an exterior body formed of laminated films and a method of manufacturing the same.

Related Art

A laminate-type power storage element houses a flat plate-shaped electrode body including a sheet-shaped positive electrode and a negative electrode in a flat-bag-shaped exterior body formed of laminated films. The laminate-type power storage element, which is appropriate for downsizing and thinning, is used as a power supply for an extremely thin electronic device (hereinafter, a thin electronic device) or similar device that incorporates a power supply, such as an IC card with a one-time password function and a display, an IC card with display, a tag, and a token (one-time password generator).

FIG. 1A and FIG. 1B illustrate an exemplary laminate-type power storage element 101. The laminate-type power storage element 101 exemplified in FIG. 1A and FIG. 1B is a lithium primary battery using a nonaqueous electrolyte. FIG. 1A is an external view of the laminate-type power storage element 101. FIG. 1B is an exploded perspective view illustrating an exemplary internal structure of the laminate-type power storage element 101.

As illustrated in FIG. 1A, the laminate-type power storage element 101 has a flat plate-shaped appearance. An exterior body 11 formed of laminated films 11a and 11b shaped into a flat rectangular bag internally seals a power generating element. In the laminate-type power storage element 101 illustrated in FIG. 1A and FIG. 1B, a positive electrode terminal plate 23 and a negative electrode terminal plate 33 are guided to outside from a predetermined margin 13 (hereinafter referred to as a terminal lead margin 13) of the rectangular exterior body 11.

Next, the following describes a structure of the laminate-type power storage element 101 with reference to FIG. 1B. FIG. 1B hatches some members and sites for easy distinction from other members and sites. As illustrated in FIG. 1B, the exterior body 11 internally seals an electrode body 10 together with electrolyte. The electrode body 10 is formed by laminating a sheet-shaped positive electrode 20 and a sheet-shaped negative electrode 30 via a separator 40.

The positive electrode 20 is formed by disposing a positive electrode material 22 containing a positive-electrode active material over one principal surface of a positive electrode current collector 21 made of a metal plate or a metal foil. The negative electrode 30 is formed by disposing a negative electrode material 32 containing a negative-electrode active material over one principal surface of a negative electrode current collector 31 made of a metal plate, a metal foil, or a similar material. The electrode body 10 is configured by laminating and press-bonding the positive electrode 20 and the negative electrode 30 such that the positive electrode material 22 and the negative electrode material 32 (hereinafter referred to as the electrode materials 22 and 32 as a whole) are opposed via the separator 40.

The exterior body 11 is configured by welding peripheral edge regions 12, which are hatched or indicated by the dotted line frame in FIG. 1B, of two rectangular aluminum laminated films (11a and 11b), which are stacked to one another, by thermocompression bonding to seal the inside. As is well-known, the laminated films (11a and 11b) have a structure where one or more resin layers are laminated on front and back of a metal foil (aluminum foil, stainless steel foil) serving as a base material. Furthermore, generally, the laminated films (11a and 11b) have a structure where a protecting layer made of, for example, a polyamide resin is laminated on a front surface, which will be an outer surface of the exterior body 11, and an adhesive layer with thermal weldability made of, for example, a polypropylene is laminated on a back surface, which will be an inner surface of the exterior body 11.

The positive electrode current collector 21 on which the positive electrode material 22 is laminated is electrically coupled to the positive electrode terminal plate 23. The negative electrode current collector 31 on which the negative electrode material 32 is laminated is electrically coupled to the negative electrode terminal plate 33. Then, the positive electrode terminal plate 23 and the negative electrode terminal plate 33 (hereinafter referred to as the electrode terminal plates (23 and 33) as a whole) are guided outside of the exterior body 11, which is in a sealing state.

Therefore, at a part to which the electrode terminal plates (23 and 33) are guided at the terminal lead margin 13 of the exterior body 11, the adhesive layers of the laminated films (11a and 11b) are not welded to one another. Thus, an adhesive strength between the electrode terminal plates (23 and 33) and the laminated films (11a and 11b) are possibly not sufficiently ensured.

At the terminal lead margin 13, it is difficult to interpose the adhesive layers in a melted state over a thickness direction of the electrode terminal plates (23 and 33). Thus, this terminal lead margin 13 is possibly not sufficiently sealed to reduce a waterproof performance.

Therefore, the laminate-type power storage element 101 has a structure for surely sealing the terminal lead margin 13 of the exterior body 11. A sealing method of the terminal lead margin 13 includes a method using tab leads 50 as the electrode terminal plates (23 and 33) and a method that mounts strip-shaped metal foils or metal plates (hereinafter referred to as terminal leads 51) to the positive electrode current collector 21 and the negative electrode current collector 31 (hereinafter referred to as the electrode current collectors (21 and 31) as a whole) to use these terminal leads 51 directly as the electrode terminal plates (23 and 33).

FIG. 1B illustrates the method using the tab leads 50. The electrode terminal plates (23 and 33) constituted of the tab leads 50 are coupled to the positive electrode current collector 21 and the negative electrode current collector 31 respectively. The tab lead 50, for example, as disclosed in Japanese Unexamined Patent Application Publication No. 2008-192451, has a structure where a sealing material (hereinafter, a tab film 52) made of insulating resin is bonded on an extension of the strip-shaped terminal lead 51 made of a metal plate or a metal foil that is substantively the electrode terminal plate (23 or 33) so as to sandwich this terminal lead 51.

The terminal leads 51 each have one end portion 53 exposed to outside of the exterior body 11, and the other end portion coupled to parts of the positive electrode current collector 21 and the negative electrode current collector 31 by a method such as ultrasonic welding. Needless to say, separate strip-shaped metal plates or metal foils may be mounted to the positive electrode current collector 21 and the negative electrode current collector 31 to further couple the tab leads 50 to these metal plates or metal foils. Then, when the flat-bag-shaped exterior body 11 is formed by thermocompression-bonding the peripheral edge regions 12 of the laminated films (11a and 11b) opposed to one another, the tab films 52 of the tab leads 50 are thermally welded with the laminated films (11a and 11b) at the terminal lead margin 13 of the peripheral edge region 12 of the exterior body 11. Accordingly, at this terminal lead margin 13, the tab films 52 welded to the terminal leads 51 are welded to the adhesive layers of the laminated films (11a and 11b).

On the other hand, the method using the terminal leads 51 directly as the electrode terminal plates (23 and 33) without the tab leads 50 further includes a method that mounts separate terminal leads 51 to the positive electrode current collector 21 and the negative electrode current collector 31, and a method that integratedly forms strip-shaped convex portions corresponding to the terminal leads 51 on the respective positive electrode current collector 21 and negative electrode current collector 31 to take these convex portions as the electrode terminal plates (23 and 33).

FIG. 2A and FIG. 2B illustrate exploded perspective views of laminate-type power storage elements (102 and 103) that employ a method without the tab leads 50. FIG. 2A illustrates the laminate-type power storage element 102 corresponding to the method that mounts the electrode terminal plates (23 and 33) as the separate terminal leads 51 to the positive electrode current collector 21 and the negative electrode current collector 31.

FIG. 2B illustrates the laminate-type power storage element 103 that disposes convex portions (24 and 34) that double as the electrode terminal plates (23 and 33) on the positive electrode current collector 21 and the negative electrode current collector 31. Then, as illustrated in FIG. 2A and FIG. 2B, the laminate-type power storage elements (102 and 103), which have employed the method without the tab leads 50, employ a method that seals the terminal lead margin 13 using strip-shaped tab films (14a and 14b) instead of the tab leads 50.

Then, in this method, in the peripheral edge region 12 of the exterior body 11, the strip-shaped tab films (14a and 14b) are bonded to the terminal lead margin 13 by thermocompression bonding, in a state where the strip-shaped tab films (14a and 14b) are preliminarily welded to the back surfaces of the laminated films (11a and 11b). Then, the exterior body 11 is shaped by thermocompression-bonding the peripheral edge regions 12 of the laminated films (11a and 11b).

That is, for the laminated films (11a and 11b) opposed to one another, the laminated films (11a and 11b) are bonded to one another via these strip-shaped tab films (14a and 14b) at the terminal lead margin 13.

Non-Patent Literature (FDK CORPORATION, "Thin Type Primary Lithium Batteries, Internet <URL: http://www.fdk.co.jp/battery/lithium/lithium_thin.html>) and Japanese Unexamined Patent Application Publication No. 2006-281613 describe such technique.

As described above, the laminate-type power storage elements 101, 102, and 103 have the structure where the electrode terminal plates (23 and 33) are guided from the flat bag-shaped exterior body 11 by thermocompression-bonding the opposed laminated films (11a and 11b) one another. Then, the method that seals the terminal lead margin 13 of the exterior body 11 basically includes the method using the tab leads 50 (hereinafter referred to as a tab lead method) and the method using the strip-shaped tab films (14a and 14b) (hereinafter referred to as a tab film method).

In the current situation, the tab lead method is a mainstream. However, in this method, the terminal leads 51 of the tab leads 50 are welded to the electrode current collectors (21 and 31) by ultrasonic welding, thus increasing man-hours in assembling the laminate-type power storage element 101, and an expensive ultrasonic welding machine is also required, thus increasing a production cost of the laminate-type power storage element 101.

Furthermore, the tab lead 50, which is a required member, is a member sold as an industrial product manufactured separately from the laminate-type power storage element 101, thus also increasing a member cost in the tab lead method compared with the tab film method.

On the other hand, the tab film method does not require the tab lead 50, which is an expensive member, and is also applicable to the electrode body 10 having a structure where the electrode terminal plates (23 and 33) and the electrode current collectors (21 and 31) are preliminarily integrated. Accordingly, the tab film method overwhelmingly has an advantage in price reduction and versatility compared with the tab lead method. Then, when the laminate-type power storage elements appropriate for downsizing and thinning are provided for use in, for example, IC cards provided in large amounts, and extremely inexpensively, and in some cases, charge-free, the price reduction is required as an extremely important matter for the laminate-type power storage element. Accordingly, it is expected that the tab-film-method laminate-type power storage element will be a mainstream in the future.

Then, when the inventor has examined reliability of the tab-film-method laminate-type power storage element, the inventor has found the reliability decreases caused by a structure of the laminated film. This will be described with reference to FIG. 3.

FIG. 3 is a side view of the laminate-type power storage element 102 illustrated in FIG. 2A in a state incorporated in a thin electronic device when being viewed from a thickness direction of the laminate-type power storage element 102.

As illustrated in FIG. 3, when the laminate-type power storage element 102 is incorporated in the thin electronic device, regions projecting outside the exterior body 11 at the electrode terminal plates (23 and 33) (hereinafter referred to as electrode terminal portions (25 and 35)) are coupled to a circuit board 100. At this time, for example, the electrode terminal portions (25 and 35) possibly bend into crank shapes. Then, when base ends (26 and 36) sides of the respective electrode terminal portions (25 and 35) of the positive electrode 20 and the negative electrode 30 bend taking the terminal lead margin 13 as a fulcrum, the electrode terminal plates (23 and 33) possibly contact the metal foils exposed on cutting surfaces 11c of the laminated films (11a and 11b) to short-circuit the positive electrode 20 and the negative electrode 30. It is considered to prevent the short circuit by sticking an insulating tape (hereinafter referred to as a protective tape) that protects the cutting surfaces 11c of the laminated films (11a and 11b). However, this protective tape inhibits thinning of the laminate-type power storage element 102, and also inhibits the cost reduction due to a member cost of the protective tape and a process addition for sticking the protective tape.

SUMMARY

A laminate-type power storage element according to one aspect to achieve the above-described object includes: an exterior body shaped into a flat bag shape by laminating a pair of laminated films to weld a peripheral edge region, the pair of laminated films being formed by forming insulating resin layers on both surfaces of a metal foil base material; an electrode body sealed within the exterior body, the electrode body being constituted by laminating a sheet-shaped positive electrode and a sheet-shaped negative electrode via a separator; a positive electrode terminal portion constituted by allowing a part of a flat plate-shaped positive electrode terminal plate coupled to the positive electrode to project outside the exterior body from a predetermined margin of the exterior body; a negative electrode terminal portion constituted by allowing a part of a flat plate-shaped negative electrode terminal plate coupled to the negative electrode to project outside the exterior body from the predetermined margin of the exterior body; and a pair of tab films welded on surfaces where the pair of laminated films oppose one another in a region along the predetermined margin in the peripheral edge region of the exterior body to mutually weld the pair of laminated films while sandwiching the positive electrode terminal plate and the negative electrode terminal plate, and the tab film is formed to cover an end surface of the laminated film while deviating outward from the exterior body from the predetermined margin at a part where the positive electrode terminal plate and the negative electrode terminal plate are guided outside the exterior body, and to cover both front and back surfaces of each of a base end of the positive electrode terminal portion and a base end of the negative electrode terminal portion.

Further, a laminate-type power storage element may have an aspect where the laminate-type power storage element includes: an exterior body shaped into a flat bag shape by laminating a pair of laminated films to weld a peripheral edge region, the pair of laminated films being formed by forming insulating resin layers on both surfaces of a metal foil base material; an electrode body sealed within the exterior body, the electrode body being constituted by laminating a sheet-shaped positive electrode and a sheet-shaped negative electrode via a separator; a strip-shaped positive electrode terminal plate coupled to the positive electrode and allowed to project outside the exterior body from one side of the exterior body; a strip-shaped negative electrode terminal plate coupled to the negative electrode and allowed to project outside the exterior body from the one side of the exterior body; and a pair of tab films welded on surfaces where the pair of laminated films oppose one another along the one side of the exterior body to mutually weld the pair of laminated films while sandwiching the positive electrode terminal plate and the negative electrode terminal plate, and at least one of the pair of laminated films is formed into a shape such that at least a region where the tab films sandwich the positive electrode terminal plate and the negative electrode terminal plate is exposed.

Further, a method of manufacturing a laminate-type power storage element according to one aspect to achieve the above-described object includes: a tab film disposing step of disposing a tab film along a predetermined margin of a laminated film formed by forming insulating resin layers on both surfaces of a metal foil base material; an exterior body sealing step of disposing a pair of the laminated films so as to allow the respective tab films to oppose one another, sandwiching an electrode body between the pair of laminated films, the electrode body being constituted by laminating a sheet-shaped positive electrode coupled to a flat plate-shaped positive electrode terminal plate and a sheet-shaped negative electrode coupled to a flat plate-shaped negative electrode terminal plate via a separator, and performing thermocompression bonding on peripheral edge regions of the pair of laminated films in a state where the positive electrode terminal plate and the negative electrode terminal plate are allowed to project outside from the predetermined margin to seal the exterior body; and a tab film deforming step of selectively performing the thermocompression bonding on a part on which the positive electrode terminal plate and the negative electrode terminal plate are positioned in the peripheral edge regions of the pair of laminated films, deviating the tab film outward from the exterior body, covering an end surface of the laminated film with the tab film, and covering both front and back surfaces of respective base end portions of a positive electrode terminal portion and a negative electrode terminal portion with the tab films, the positive electrode terminal portion being a part allowed to project outside the exterior body in the positive electrode terminal plate, the negative electrode terminal portion being a part allowed to project outside the exterior body in the negative electrode terminal plate.

BRIEF DESCRIPTION OF THE DRAWINGS

For a more complete understanding of the present disclosure and the advantages thereof, reference is now made to the following description taken in conjunction with the accompanying drawings wherein.

DETAILED DESCRIPTION OF THE INVENTION

Figure 1A:
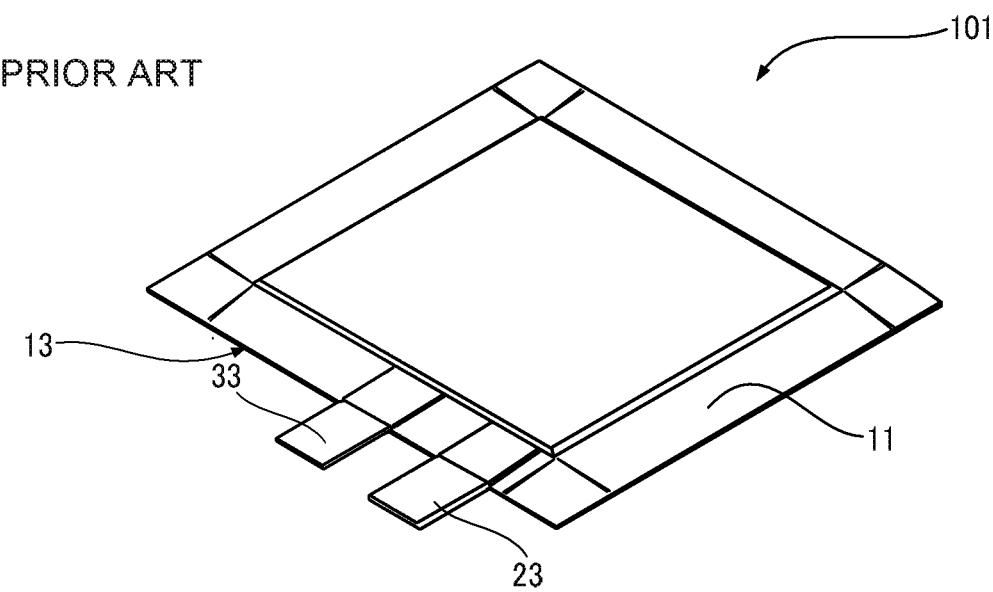
FIG. 1A is an external view of a laminate-type power storage element.
Figure 1B:
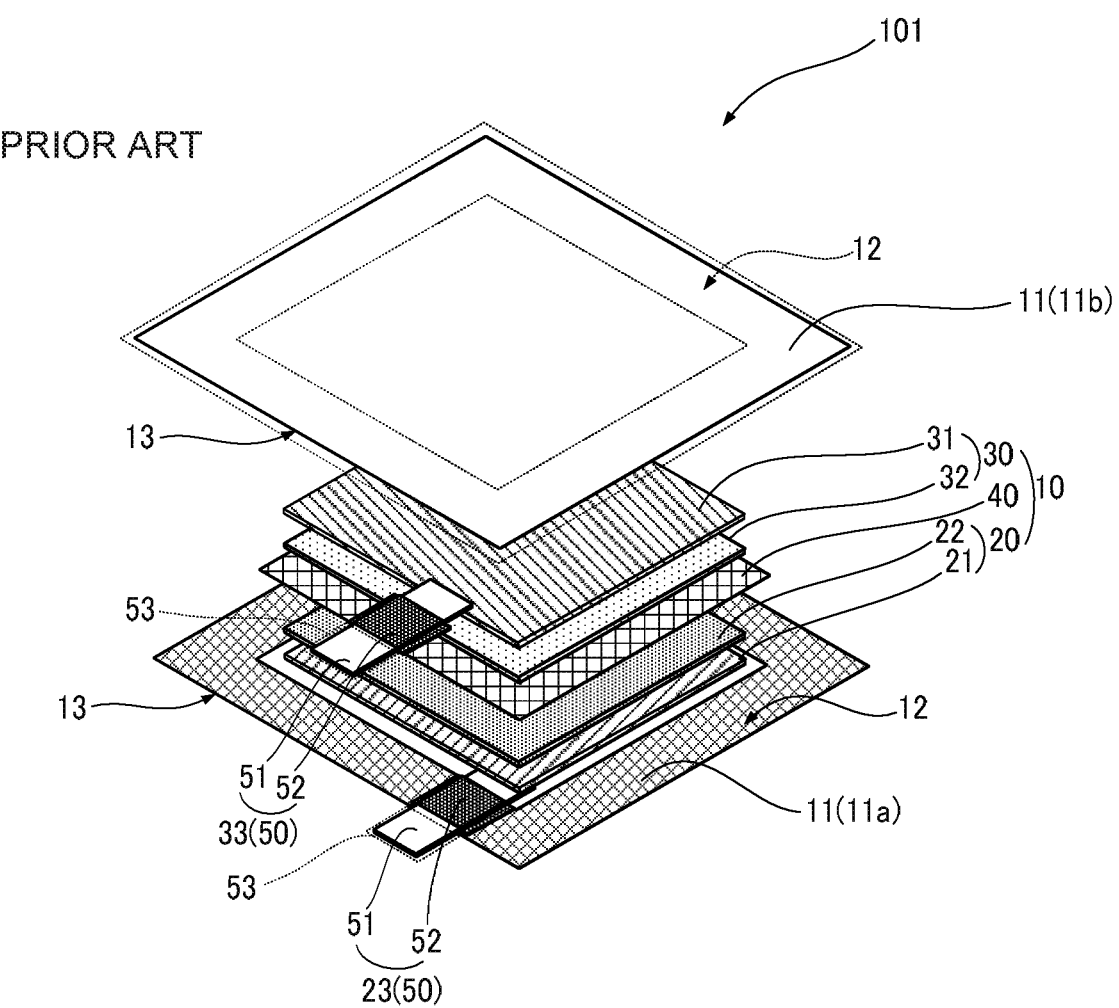
FIG. 1B is an exploded perspective view illustrating an exemplary internal structure of the laminate-type power storage element.

The following describes working examples of the present disclosure with reference to the attached drawings. Like reference numerals designate corresponding or identical elements in the drawings used for the following description, and therefore such elements may not be further elaborated. While a reference numeral is assigned to a part in a drawing, if unnecessary, the reference numeral may not be assigned to the corresponding part in another drawing.
Process of Arriving at this Embodiment As described above, in the laminate-type power storage element 102, cross-sectional surfaces of the metal foils of the laminated films (11a and 11b) are exposed at the terminal lead margin 13 of the exterior body 11. The electrode terminal plates (23 and 33) possibly contact these cutting surfaces 11c to cause the short circuit to occur. Thus, it is difficult to solve this occurrence of the short circuit while especially ensuring the thinning and the cost reduction at the same time. Accordingly, the inventor considered that if the strip-shaped tab films (14a and 14b) used for sealing the terminal lead margin 13 have charge of a function similar to that of the protective tape, since the electrode terminal portions (25 and 35) do not directly contact the cutting surfaces 11c of the laminated films (11a and 11b), the short circuit did not occur, additional members such as the protective tape are not required, and the thickness can also be made equal to that of the conventional laminate-type power storage element.

Figure 4A:
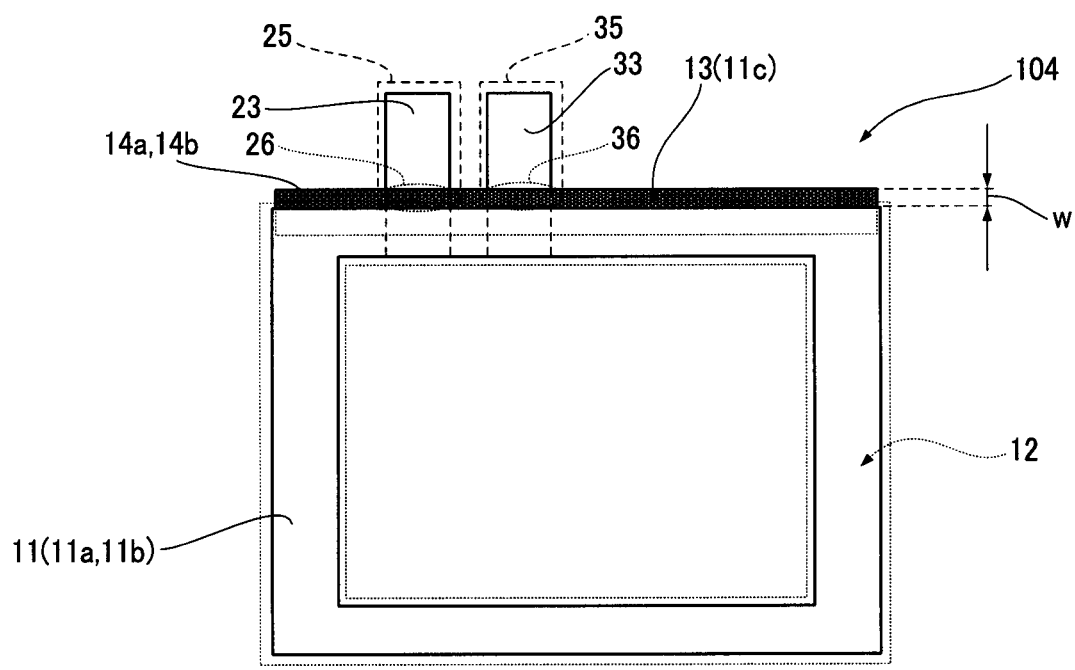
FIG. 4A is a view illustrating a prototype laminate-type power storage element.
Figure 4B:
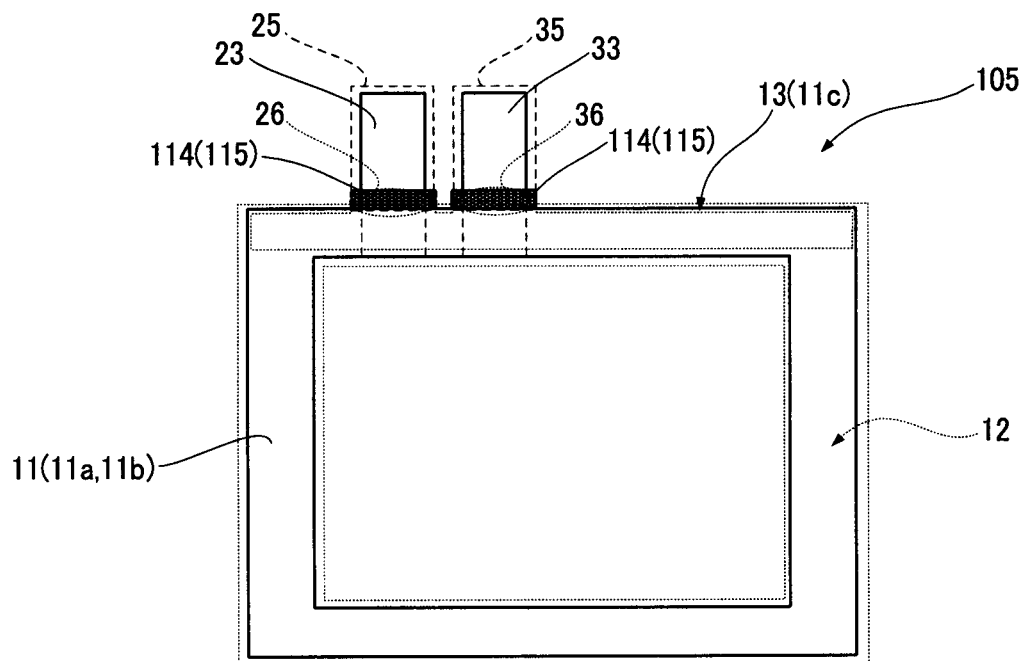
FIG. 4B is a view illustrating a prototype laminate-type power storage element.

FIG. 4A illustrates a laminate-type power storage element 104 using the strip-shaped tab films (14a and 14b) also as the protective tapes. FIG. 4B illustrates a laminate-type power storage element 105 using strip-shaped tab films 114 also as the protective tapes.

In the laminate-type power storage element 104 illustrated in FIG. 4A, the tab films (14a and 14b) are projected only by a predetermined width w from the terminal lead margin 13. Accordingly, even if the electrode terminal plates (23 and 33) bend, the tab films (14a and 14b) can cover the cutting surfaces 11c of the laminated films (11a and 11b) to prevent the short circuit.

Figure 4C:
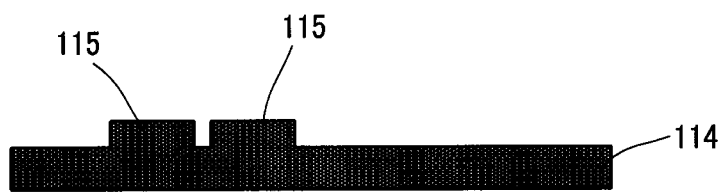
FIG. 4C is a view illustrating the prototype laminate-type power storage element.

In the laminate-type power storage element 105 illustrated in FIG. 4B, as illustrated in FIG. 4C, the tab films 114 are used on which convex portions 115 along lead shapes of the electrode terminal plates (23 and 33) are disposed, and only these convex portions 115 project from the terminal lead margin 13 to cover the base ends (26 and 36) of the electrode terminal portions (25 and 35).

However, when the two kinds of laminate-type power storage elements (104 and 105) illustrated in FIG. 4A and FIG. 4B were actually prototyped, both of laminate-type power storage elements (104 and 105) required improvement.

First, in the laminate-type power storage element 104 illustrated in FIG. 4A, it is difficult to accurately form the peripheral edge regions 12 in a sealing process where the thermocompression bonding is performed on the peripheral edge regions 12 of the laminated films (11a and 11b) to seal an inside of the exterior body 11. Specifically, in the sealing process, the two laminated films (11a and 11b) are required to be laminated one another in a state where the two laminated films (11a and 11b) are accurately positioned. Then, when the peripheral edge regions 12 are formed by the thermocompression bonding, it is necessary not to break the electrode body by contact of a thermocompression bonding jig with a housing region of the electrode body 10.

Figure 5:
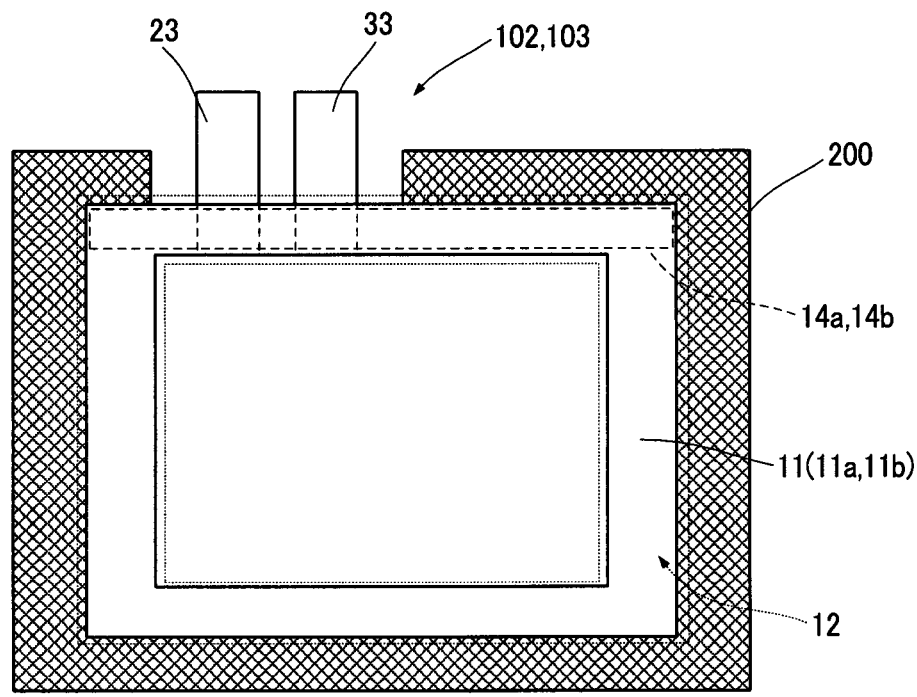
FIG. 5 is a view illustrating a positioning jig used when the laminate-type power storage element is manufactured.

Accordingly, in the sealing process, as illustrated in FIG. 5, by using a jig that surrounds outer shapes of the rectangular laminated films (11a and 11b) (hereinafter referred to as a positioning jig 200), positioning is performed based on the outer shapes of the laminated films (11a and 11b). This positioning jig 200 has a simple structure, but if only dimension accuracies of the laminated films (11a and 11b) are ensured, extremely accurate positioning can be performed extremely easily. Therefore, in order to manufacture the laminate-type power storage element 104 at lower cost, the positioning jig 200 is desirably used.

Figure 6:
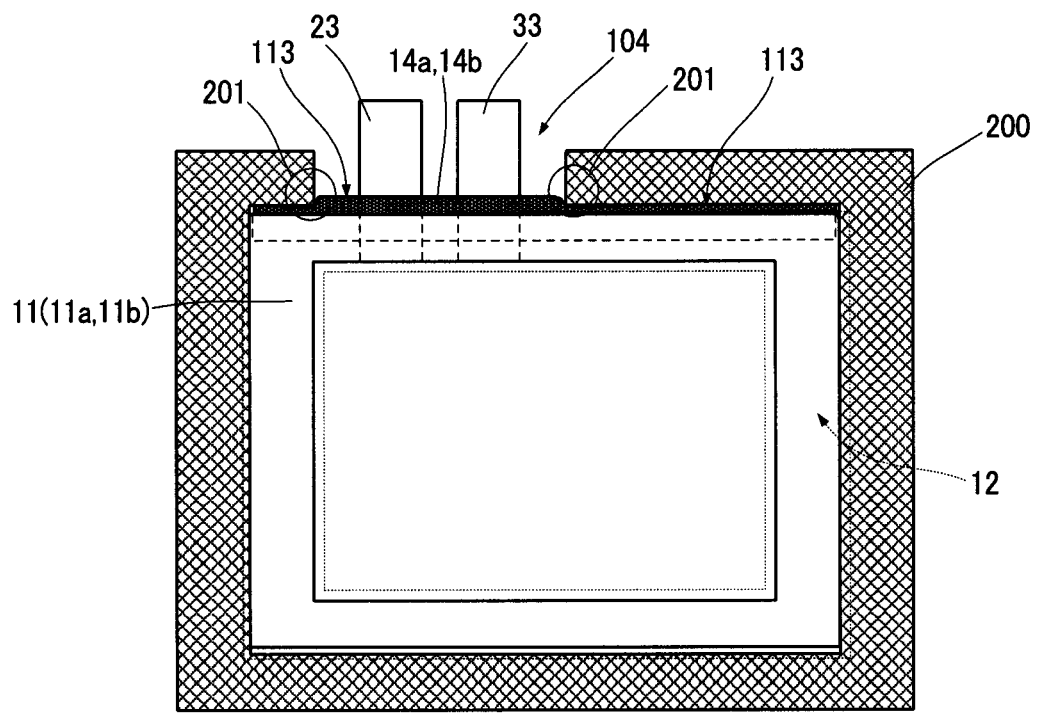
FIG. 6 is a view for describing a state when the prototype laminate-type power storage element is manufactured using the positioning jig.

However, as in the laminate-type power storage element 104 illustrated in FIG. 4A, if the tab films (14a and 14b) are projected from the terminal lead margin 13 by the uniform width w, these projected tab films (14a and 14b) prevent positioning using the outer shapes of the laminated films (11a and 11b). It is also considered to improve a shape and a size of the positioning jig 200 in consideration of the projection width w of the tab film 14. However, the tab films (14a and 14b) are strip-shaped films constituted of a three-layer structure where taking a film made of resin such as polyethylene naphthalate (PEN) as a substrate body, adhesive layers made of thermoplastic resin (for example, modified polypropylene such as PPa) are formed on both front and back surfaces of this substrate body, or a single-layered adhesive layer without the substrate body. When the terminal lead margin 13 is sealed, regions of the tab films (14a and 14b) projected from the exterior body 11 dissolve to deform, thus causing a possibility of deviation of the position during the sealing process. It is also considered to seal three sides except for the terminal lead margin 13 to finally seal the terminal lead margin 13. However, as illustrated in FIG. 6, if margins 113 of the tab films (14a and 14b) are abutted on the positioning jig 200 for positioning, as illustrated within circular frames 201 in FIG. 6, the tab films (14a and 14b) themselves easily deform. Thus, a positioning accuracy is not ensured. That is, it is difficult to take the outer shapes of the tab films (14a and 14b) as positioning bases.

Meanwhile, as illustrated in FIG. 4B, in the method using the tab films 114 on which the convex portions 115 along the lead shapes of the electrode terminal plates (23 and 33) are disposed, only the convex portions 115 of the tab films 114 project from the terminal lead margin 13. Accordingly, positioning can be performed by the outer shapes of the laminated films (11a and 11b) also using the positioning jig 200 illustrated in FIG. 5.

However, as a process before the two laminated films (11a and 11b) are stacked, a process where the convex portions 115 are precisely matched to the lead positions of the electrode terminal plates (23 and 33) is required, thus increasing the production cost. The tab films 114 on which the convex portions 115 are disposed are specially prepared differently from the strip-shaped tab films (14a and 14b). These tab films 114 including the convex portions 115 will be a factor that increases the member cost.

Accordingly, it is preferred not to use the special-shaped tab films 114 and to ensure positioning based on the outer shapes of the laminated films (11a and 11b) in the sealing process. Needless to say, even if this structure is employed, it is also necessary that this structure is a structure that can maintain thinness equal to or more than that of a conventional structure without cost increase. Then, the inventor seriously studied the structure of a laminate-type power storage element that can react to these requests, thus arriving at the present embodiment.

First Embodiment
Embodiment

Figure 7A:
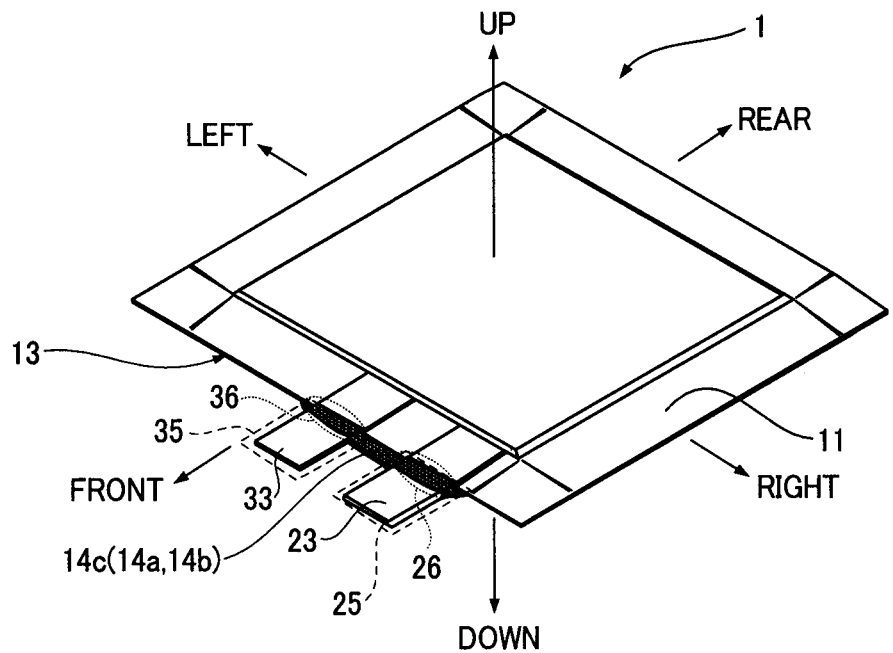
FIG. 7A is a view illustrating a laminate-type power storage element according to a first embodiment.
Figure 7B:
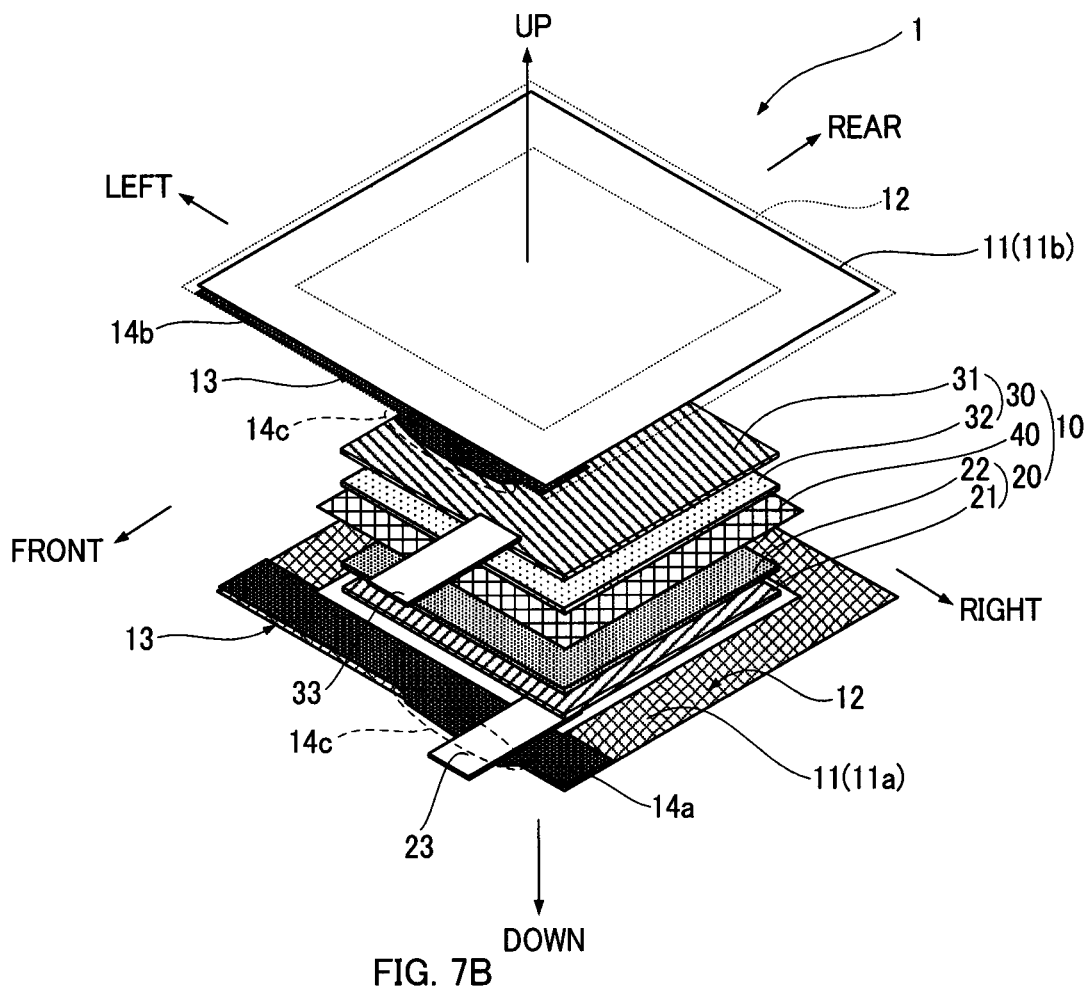
FIG. 7B is a view illustrating the laminate-type power storage element according to the first embodiment.

FIG. 7A and FIG. 7B illustrate a laminate-type power storage element 1 (hereinafter referred to as a power storage element 1) according to one embodiment of the present disclosure. FIG. 7A is a perspective view illustrating an appearance of the power storage element 1. FIG. 7B is an exploded perspective view of the power storage element 1.

In the following description, as illustrated in FIG. 7A and FIG. 7B, in the power storage element 1, a laminating direction of the two laminated films (11a and 11b) and power generating elements (the positive electrode 20, the negative electrode 30, and the separator 40) in the electrode body 10 is an up-down direction, and a projecting direction of the electrode terminal plates (23 and 33) is a front-rear direction. A direction perpendicular to each of the up-down and front-rear directions is a right-left direction. Then, taking FIG. 7A as a perspective view viewed from the upper right and the front, the respective up-down, right-left, and front-rear directions are specified.

Then, as illustrated in FIG. 7A and FIG. 7B, in the power storage element 1 according to the present embodiment, parts 14c on extensions of the tab films (14a and 14b) that are normally strip-shaped that extend right and left deform forward. Then, these deformed regions (hereinafter referred to as deformation portions 14c) cover both upper and lower surfaces of the base ends (26 and 36) of the electrode terminal portions (25 and 35) while deviating outward from the exterior body 11.

FIG. 7B illustrates the upper and lower two tab films (14a and 14b) individually. However, in practice, the two tab films (14a and 14b) are welded to one another while sandwiching the positive and negative electrode terminal plates (23 and 33).

Then, in the power storage element 1 according to the embodiment, the deformation portions 14c prevent the short circuit by the action similar to that of the tab films 114 on which the convex portions 115 are selectively disposed illustrated in FIG. 4B on ahead. At the tab films (14a and 14b), regions except for the deformation portions 14c do not project outside the exterior body 11, thus ensuring maintenance of the positioning accuracy when the two laminated films (11a and 11b) are laminated in the sealing process.

Further, even if bending stress is applied in a direction opposite to the lead direction of the electrode terminal plates (23 and 33), the base ends (26 and 36) of the electrode terminal portions (25 and 35) are covered with the deformation portions 14c made of resin. Thus, the electrode terminal plates (23 and 33) do not bend at an acute angle taking the terminal lead margin 13 as the fulcrum. Therefore, this can prevent break of the electrode terminal plates (23 and 33) taking the terminal lead margin 13 as an edge.

Method of Manufacturing Power Storage Element 1

Figure 2A:
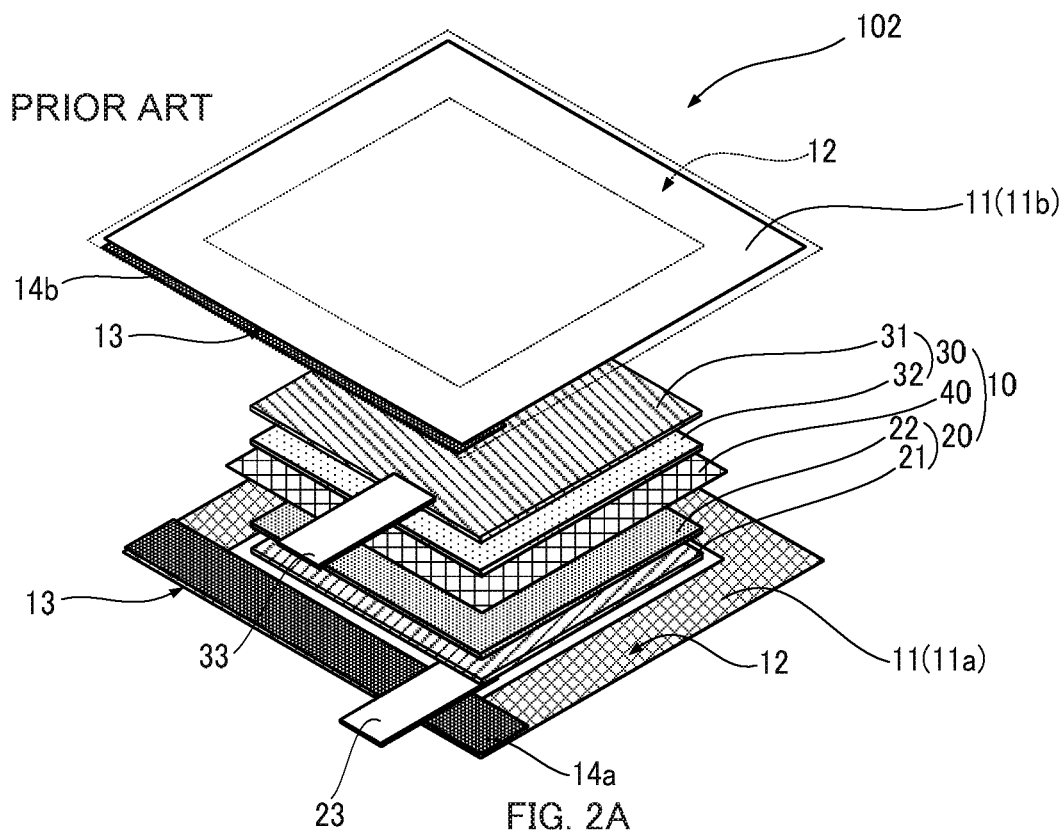
FIG. 2A is a view illustrating an exemplary laminate-type power storage element employing a tab film method.

Next, the following describes a method of manufacturing the power storage element 1 according to the above-described embodiment. Schematically, after the power storage element 102 illustrated in FIG. 2A is manufactured, the deformation portions 14c in the power storage element 1 according to the embodiment of the present disclosure illustrated in FIG. 7A and FIG. 7B are famed. In the power storage element 1 according to the embodiment manufactured here, the electrode body 10 has a configuration similar to that of a thin manganese dioxide lithium primary battery described in above-described Non-Patent Literature, and the exterior body 11 has outside dimensions whose vertical length is 22 mm, lateral width is 27 mm, and thickness in the housing region of the electrode body 10 is 0.45 mm.

FIG. 8A to FIG. 8H illustrate the method of manufacturing the power storage element 1 according to the present embodiment. FIG. 8A to FIG. 8H illustrate respective processes in this method of manufacturing in order. In the respective processes, at least in the processes illustrated in FIG. 8A to FIG. 8G, the above-described positioning jig 200 is used. The respective up-down, front-rear, and right-left directions in FIG. 8A to FIG. 8H are directions specified with respect to the power storage element 1 in an assembled state. When the positioning jig 200 is placed on a horizontal surface, a direction that the backside surfaces of the laminated films (11a and 11b) mounted on the positioning jig 200 face is vertically upward or vertically downward, and this direction differs depending on the process.

Figure 8A:
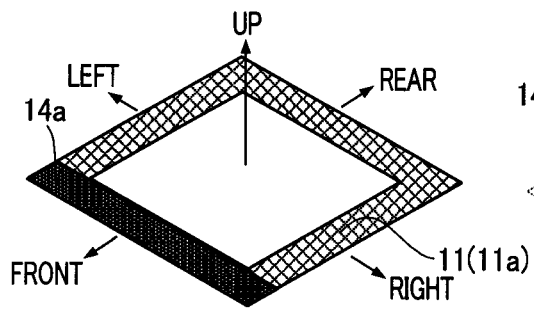
FIG. 8A is a view illustrating a method of manufacturing the laminate-type power storage element according to the first embodiment.

First, as illustrated in FIG. 8A, the tab film 14a is welded to the terminal lead margin 13 of the laminated film 11a after positioning. Here, a three-layers type tab film 14a taking a PEN film as the substrate body and having front and back surfaces on which PPa adhesive layers are formed is used. In a state where this tab film 14a is disposed in a vertical direction on the laminated film 11a, the thermocompression bonding is performed, for example, in a condition where the temperature is 100° C., the period is one second, and the pressure is 0.2 MPa.

Figure 8B:
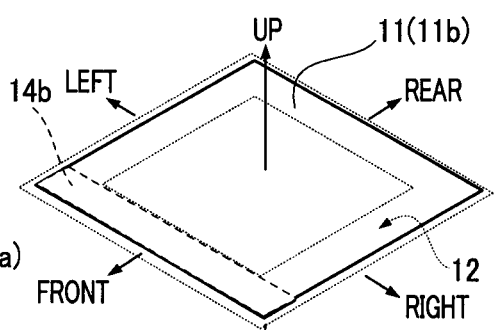
FIG. 8B is a view illustrating the method of manufacturing the laminate-type power storage element according to the first embodiment.

As illustrated in FIG. 8B, the tab film 14b is welded to the terminal lead margin 13 of the laminated film 11b after positioning. Here, a three-layers type tab film 14b taking a PEN film as the substrate body and having front and back surfaces on which PPa adhesive layers are formed is used. In a state where this tab film 14b is disposed in a vertical direction on the laminated film 11b, the thermocompression bonding is performed, for example, in a condition where the temperature is 100° C., the period is one second, and the pressure is 0.2 MPa.

Figure 8C:
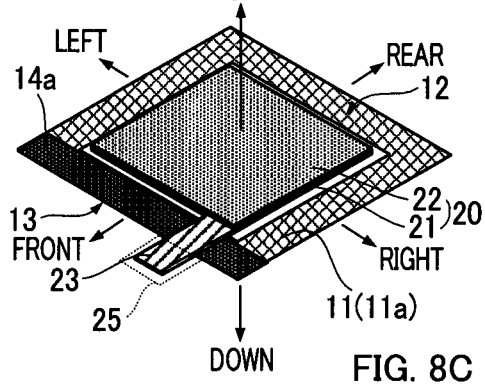
FIG. 8C is a view illustrating the method of manufacturing the laminate-type power storage element according to the first embodiment.

Then, as illustrated in FIG. 8C, the positive electrode 20, which has already been assembled, is laminated on a top surface of the lower (the positive electrode 20 side) laminated film 11a, and a distal end side of the positive electrode terminal plate 23 is projected outward from the tab film 14a to make this projecting region the electrode terminal portion 25 of the positive electrode 20. Then, the thermocompression bonding is performed on a laminated region of the tab film 14a and the positive electrode terminal plate 23 to weld the positive electrode terminal plate 23 and the tab film 14a.

Figure 8D:
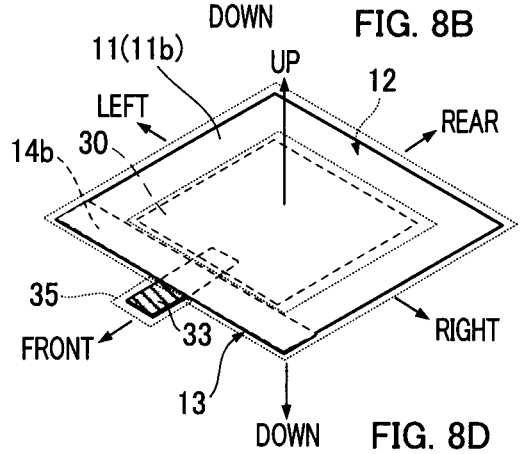
FIG. 8D is a view illustrating the method of manufacturing the laminate-type power storage element according to the first embodiment.

For the upper (the negative electrode 30 side) laminated film 11b, as illustrated in FIG. 8D, the negative electrode 30, which has already been assembled, is laminated below the negative electrode 30 side laminated film 11b, and a distal end side of the negative electrode terminal plate 33 is projected outward from the tab film 14b to make this projecting region the electrode terminal portion 35 of the negative electrode 30. Then, the thermocompression bonding is performed on a laminated region of the negative electrode terminal plate 33 and the laminated film 11b to weld the tab film 14b to the negative electrode terminal plate 33. This completes an assembled component at the negative electrode 30 side.

Figure 8E:
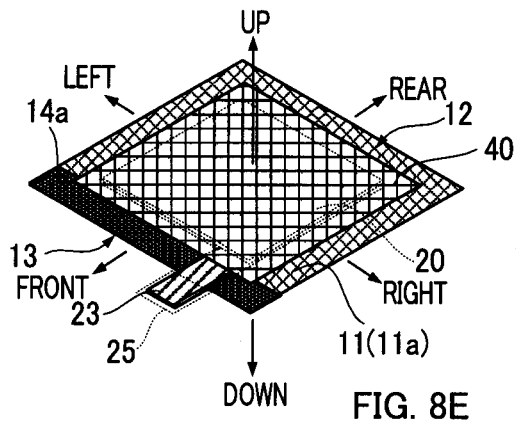
FIG. 8E is a view illustrating the method of manufacturing the laminate-type power storage element according to the first embodiment.
Figure 8F:
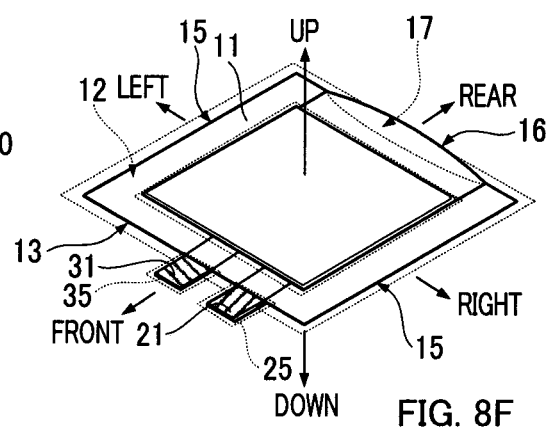
FIG. 8F is a view illustrating the method of manufacturing the laminate-type power storage element according to the first embodiment.

Next, as illustrated in FIG. 8E, the separator 40 is disposed on a top surface of the positive electrode 20 to complete an assembled component at the positive electrode 20 side. Then, as illustrated in FIG. 8F, the assembled components at the positive electrode 20 side and the negative electrode 30 side are laminated using the positioning jig 200, and further, at the peripheral edge regions 12 of the rectangular laminated films (11a and 11b) opposed to one another, the thermocompression bonding is performed on three margins (13 and 15) sides including the terminal lead margin 13, for example, in a condition with 150° C., one second, and 0.2 MPa. These mutually shape the bag-shaped exterior body 11 having an opening 17 at one side 16. Then, the electrolyte is injected into the bag-shaped exterior body 11 from this opening 17, and the thermocompression bonding is performed on the margin 16 side at which this opening 17 presents at the peripheral edge region 12 to seal the exterior body 11. This first completes the power storage element 102 illustrated in FIG. 2A.

Figure 8G:
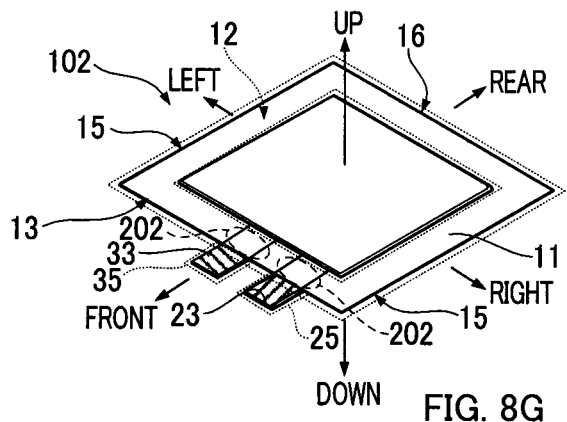
FIG. 8G is a view illustrating the method of manufacturing the laminate-type power storage element according to the first embodiment.
Figure 8H:
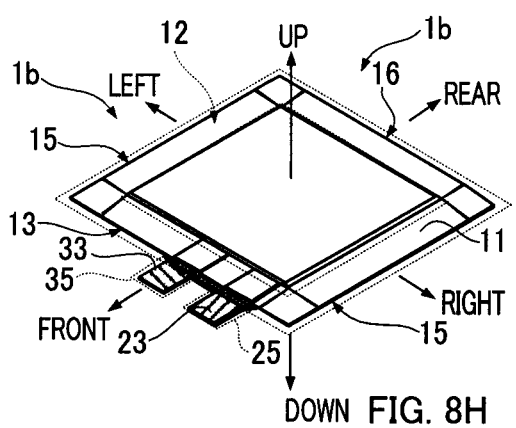
FIG. 8H is a view illustrating the method of manufacturing the laminate-type power storage element according to the first embodiment.

As described above, after the power storage element 102 is completed, this power storage element 102 is taken out from the positioning jig 200, and as illustrated in FIG. 8G, at the sealing region of the exterior body 11, the thermocompression bonding is again performed, selectively in a predetermined condition (for example, 100° C., one second, and 0.2 MPa), on regions 202 to which the electrode terminal plates (23 and 33) are guided at the terminal lead margin 13 side, and then a part of the adhesive layers of the tab films (14a and 14b) on which the thermocompression bonding has been performed into strip shapes is eluted outward from the exterior body 11. Then, if the adhesive layers harden in the eluted shape, as illustrated in FIG. 8H, the power storage element 1 according to the present embodiment is completed.

In a procedure for manufacturing the power storage element 1 according to the embodiment illustrated in FIG. 8A to FIG. 8H, the procedure in FIG. 8A to FIG. 8G, that is, the procedure for manufacturing the power storage element 102 is not limited to the above-described working example. The following procedure is conceivable. For example, first, the electrode body 10 is assembled, and the tab films (14a and 14b) are disposed along the terminal lead margins 13 of the respective laminated films (11a and 11b) at the positive electrode 20 side and the negative electrode 30 side. Then, the electrode body 10, which has been already assembled, is disposed between the laminated film 11a and the laminated film 11b, and then, the thermocompression bonding is performed on the peripheral edge regions 12 of the laminated films (11a and 11b).

Figure 2B:
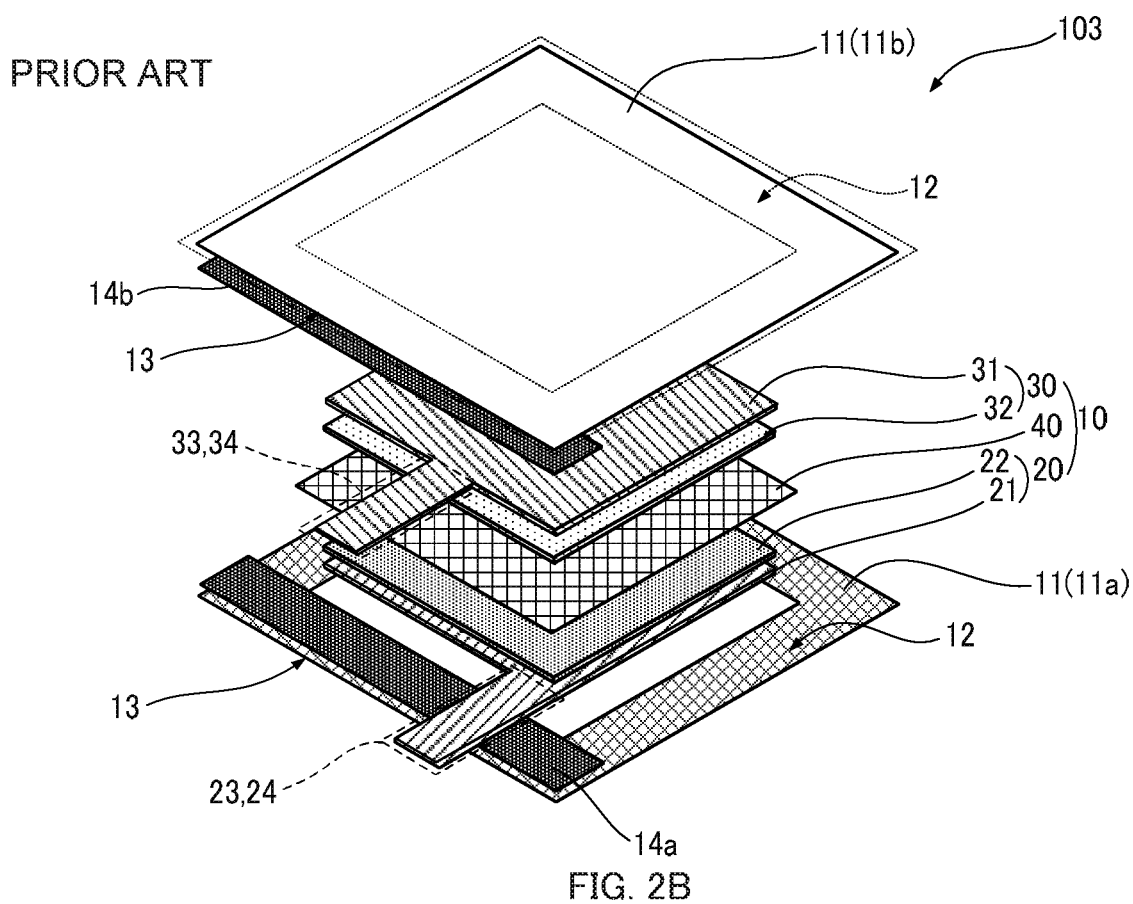
FIG. 2B is a view illustrating the exemplary laminate-type power storage element employing the tab film method.

Needless to say, the power storage element 1 in the embodiment may be created by creating the power storage element 103 illustrated in FIG. 2B to perform a process similar to the process illustrated in FIG. 8G on this power storage element 103. In any case, in the process before FIG. 8H, it is only necessary to manufacture a power storage element having a sealing structure in the tab film method.

Reliability Test

Next, taking the power storage element 1 according to the embodiment manufactured in the procedure in FIG. 8A to FIG. 8H and the power storage element 102 obtained in this manufacturing process as samples, for each sample, 30 pieces of individuals were manufactured. Then, the following test was performed. The electrode terminal plates (23 and 33) of the positive electrodes 20 and the negative electrodes 30 of all the individuals were bent at an angle of 90° upward (or downward) at parts of the base ends (26 and 36) of the electrode terminal portions (25 and 35). Then, an occurrence status of the short circuit between the positive electrode terminal plates 23 and the negative electrode terminal plates 33 was examined.

As a result, in the sample of the power storage element 1 in the embodiment, among the 30 pieces of individuals, the short circuit never occurred at any individual. Meanwhile, in the sample of the power storage element 102, the short circuits occurred at 28 pieces of individuals.

As described above, it has been confirmed that the power storage element 1 surely prevents the short circuit due to the contact between the metal foils exposed on the cutting surfaces 11c of the laminated films (11a and 11b) and the electrode terminal portions (25 and 35) and has a high reliability.

Other Working Examples

The power storage element 1 according to the first embodiment of the present disclosure is applicable to various kinds of storage elements (for example, a lithium secondary battery and an electric double layer capacitor), not limited to the lithium primary battery, insofar as the power storage element 1 has a structure that seals the flat plate-shaped electrode body 10 into the exterior body 11 constituted of the laminated films (11a and 11b).

The power storage element 1 according to the first embodiment may be a single-layer type including one each of the sheet-shaped positive electrode 20 and negative electrode 30, or may be a multilayer type including the electrode bodies 10 for a plurality of layers.

The single-layer type power storage element 1 has a basic structure to achieve thinning by including only the smallest number of electrode bodies 10. Then, the power storage element 1 according to the present embodiment has a structure where the deformation portions 14c are formed on the tab films (14a and 14b) to set out thinning.

Therefore, when the power storage element 1 according to the present embodiment is the single-layer type, a combined effect of the structure of the single-layer type power storage element 1 and the structure using the tab films (14a and 14b) on which the deformation portions 14c are formed can make the effect of the thinning immeasurable.

Needless to say, even for the multilayer type power storage element 1, the cost reduction can be expected by eliminating the need of the protective tapes that insulate the cutting surfaces 11c of the laminated films (11a and 11b) and the sticking process of these protective tapes.

In the method of manufacturing the power storage element 1 according to the first embodiment, the terminal lead margin 13 of the exterior body 11 is sealed via the strip-shaped tab films (14a and 14b), and followed by this sealing process, the thermocompression bonding is again performed on the parts 202 in the peripheral edge region 12 at the terminal lead margin 13 side to form the deformation portions 14c.

However, depending on a type and a size of an electronic device where the power storage element 1 is incorporated, the presence/absence of the deformation portions 14c is possibly not asked. In such case, the formation process of the deformation portions 14c is not continuously performed after the sealing process, and may be performed immediately before the shipping of the power storage element 1 or immediately before the power storage element 1 is incorporated in the electronic device. This can save the cost required for stock control.

If a thermocompression bonding jig that can change the temperature and the pressure depending on the regions 202 on which the deformation portions 14c are formed and the other region 12 is used, the deformation portions 14c can be simultaneously formed in the process that seals the terminal lead margin 13.

When the deformation portions 14c are formed, while it is possible to reduce the man-hour and a manufacturing period, which contributes to the cost reduction, a special thermocompression bonding jig that leads to the cost increase is necessary. However, when the deformation portions 14c are formed after the sealing process, the existing thermocompression bonding jig can be used in the sealing process. This is flexibly applicable to various usages of the power storage element 1. It is also possible to manufacture conventional storage elements and the power storage elements 1 according to the present embodiment in the mix in an identical manufacturing line.

The outer shape of the exterior body 11 is preferred to be a rectangular, or at least to have a straight terminal lead margin 13, in that general-purpose strip-shaped tab films (14a and 14b) can be used. However, if the base ends (26 and 36) of the electrode terminal portions (25 and 35) are covered with the tab films (14a and 14b) deviated to the outside of the exterior body 11, the exterior body 11 is not necessarily to have these shapes, and for example, may have an appropriate shape such as a circular or polygonal planar shape.

In the power storage element 1 according to the above-described embodiment, the positive electrode terminal plate 23 and the negative electrode terminal plate 33 are guided from the exterior body 11 in the identical direction. However, the positive electrode terminal plate 23 and the negative electrode terminal plate 33 may be guided in opposite directions from two margins 13 opposed to one another at the exterior body 11. Needless to say, the electrode terminal plates (23 and 33) may be guided in directions that intersect with one another, such as two margins 13 adjacent to one another on the rectangular planar surface.

Second Embodiment
Embodiment

Figure 9A:
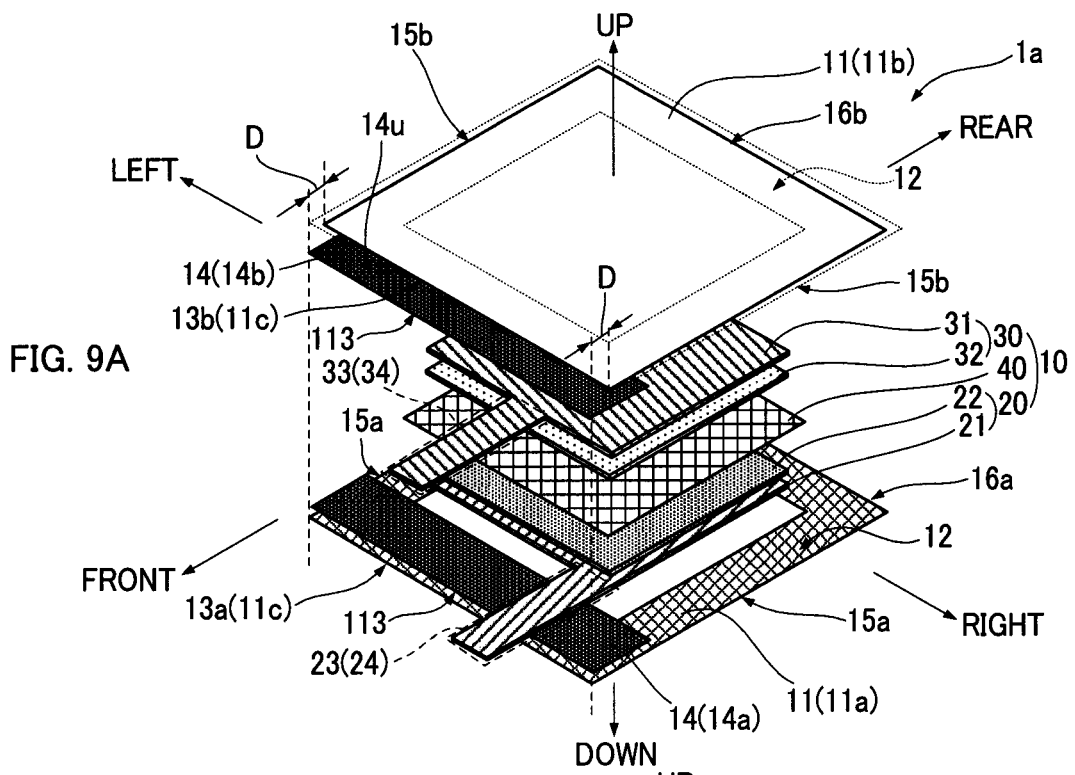
FIG. 9A is a view illustrating a laminate-type power storage element according to a second embodiment.
Figure 9B:
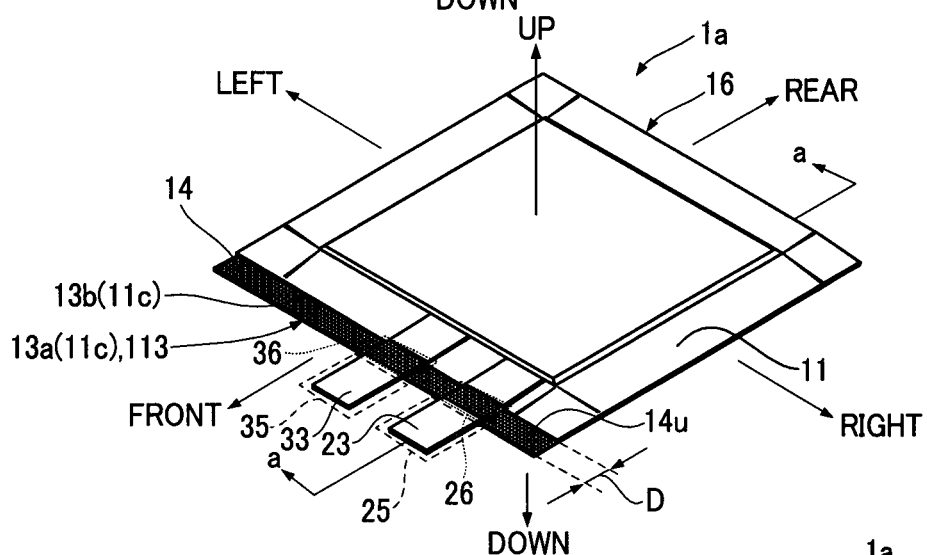
FIG. 9B is a view illustrating the laminate-type power storage element according to the second embodiment.
Figure 9C:
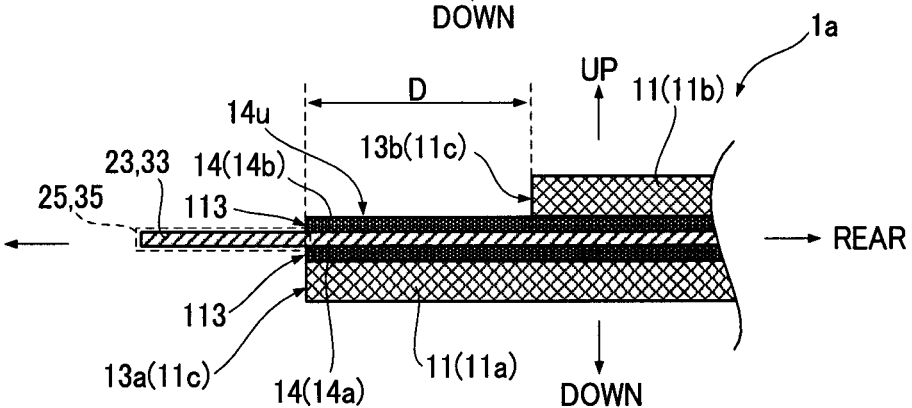
FIG. 9C is a view illustrating the laminate-type power storage element according to the second embodiment.

FIG. 9A to FIG. 9C illustrate a laminate-type power storage element 1a according to a second embodiment of the present disclosure. FIG. 9A is an exploded perspective view of the laminate-type power storage element 1a. FIG. 9B is a perspective view illustrating an appearance of the laminate-type power storage element 1a. FIG. 9C is an enlarged view of a part of a cross section viewed from an arrow a-a in FIG. 9B.

In the following description, as illustrated in FIG. 9A to FIG. 9C, in the laminate-type power storage element 1a, the thickness direction of the flat-bag-shaped exterior body 11, that is, the laminating direction of the two laminated films (11a and 11b) and the power generating elements (the positive electrode 20, the negative electrode 30, and the separator 40) in the electrode body 10 is the up-down direction, and the projecting direction of the electrode terminal plates (23 and 33) is the front-rear direction. The direction perpendicular to each of the up-down and front-rear directions is the right-left direction. Then, in the following description, with FIG. 9A and FIG. 9B taken as perspective views viewed from the upper right and the front, the respective up-down, right-left, and front-rear directions are specified.

In the laminate-type power storage element 1a according to the present embodiment, as illustrated in FIG. 9A, right and left margins 15b of the upper laminated film 11b and right and left margins 15a of the lower laminated film 11a have different lengths. In the example illustrated in FIG. 9A, the right and left margins 15a of the lower laminated film 11a are longer than the right and left margins 15b of the upper laminated film 11b by a length D. Then, the upper and lower laminated films (11a and 11b) are laminated with the right and left margins (15a and 15b) and rearward margins (16a and 16b) being aligned one another. Accordingly, a terminal lead margin 13a of the lower laminated film 11a projects ahead with respect to a terminal lead margin 13b of the upper laminated film 11b.

The two strip-shaped tab films (14a and 14b) have identical shapes, and sandwich the respective electrode terminal plates (23 and 33) of the positive electrode 20 and the negative electrode 30 together in a state where the two strip-shaped tab films (14a and 14b) have outer shapes aligned with one another. At the two tab films (14a and 14b), the front margins 113 are aligned with the terminal lead margin 13a of the lower laminated film 11a, rear end sides are interposed between the two laminated films (11a and 11b). Accordingly, if the peripheral edge regions 12 of the two laminated films (11a and 11b) are welded, as illustrated in FIG. 9B, a top surface 14u of the tab film 14 is exposed in a strip-shaped region having a front-to-rear width D that projects ahead of the terminal lead margin 13b of the upper laminated film 11b. Then, in the laminate-type power storage element 1a according to the second embodiment, as illustrated in FIG. 9C, in a region between the terminal lead margins (13a and 13b) of the two laminated films (11a and 11b), top surfaces of the electrode terminal plates (23 and 33) will be covered with the tab film 14. Therefore, the electrode terminal portions (25 and 35) do not contact the cutting surfaces 11c of the laminated films (11a and 11b), insofar as the electrode terminal portions (25 and 35) are folded on the upper side.

Figure 3:
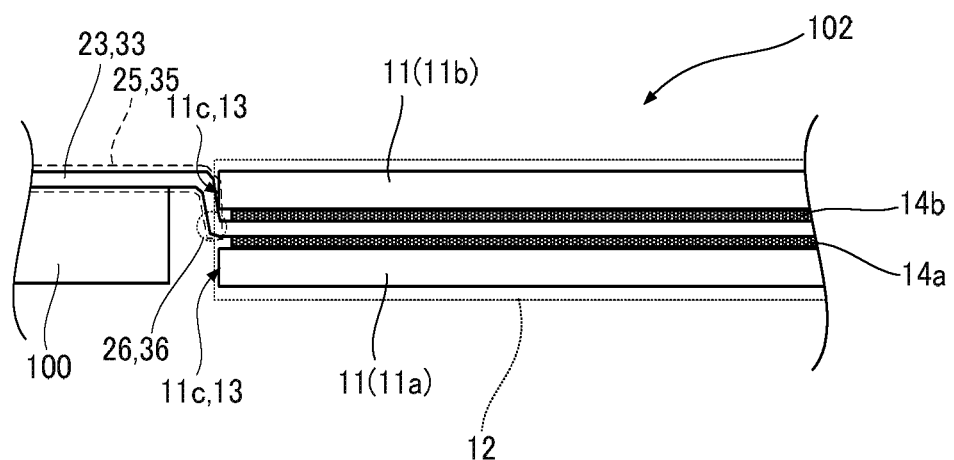
FIG. 3 is a view for describing a laminated film employing the tab film method.

In the laminate-type power storage element 1a according to the present embodiment, if the electrode terminal portions (25 and 35) are bent downward, the electrode terminal plates (23 and 33) contact the metal foil exposed on the cutting surface 11c of the lower laminated film 11a, and thus there is a possibility that the short circuit may occur. However, such short circuit is likely to occur when the laminate-type power storage element 1a is incorporated in the thin electronic device as also illustrated in FIG. 3. That is, when the laminate-type power storage element 1a is incorporated in the thin electronic device, if only directions of a top surface and a lower surface of the laminate-type power storage element 1a are not incorrect, the short circuit is less likely to occur.

Then, in the laminate-type power storage element 1a according to the present embodiment, the tab film 14 is exposed in a direction to which the electrode terminal plates (23 and 33) may be bent, thus facilitating confirmation of correct directions of the top surface and the lower surface when the laminate-type power storage element 1a is incorporated in the electronic device.

In the laminate-type power storage element 1a according to the present embodiment, it is only necessary to change the sizes of the two laminated films (11a and 11b) that constitute the exterior body 11, and one laminated film 11a (or 11b) among the two laminated films (11a and 11b) may be identical to that used for the laminate-type power storage elements 1, 102, and 103. That is, the effect that can prevent the short circuit is sufficiently obtained almost without the cost increase.

In the laminate-type power storage element 1a according to the present embodiment, the front margin 113 of the tab film 14 is aligned with the terminal lead margin 13a of the lower laminated film 11a, and the tab film 14 does not project outward with respect to a planar surface region of the exterior body 11. Therefore, the positioning accuracy can be maintained when the two laminated films (11a and 11b) are laminated in the sealing process, thus ensuring positioning based on the outer shape of the lower laminated film 11a as illustrated in FIG. 5.

Needless to say, the base ends (26 and 36) at top surface sides of the electrode terminal portions (25 and 35) are covered with the tab film 14 made of resin. Thus, insofar as the electrode terminal plates (23 and 33) are bent on the upper side, the electrode terminal plates (23 and 33) are not bent at the acute angle taking the terminal lead margin 13b of the upper laminated film 11b as the fulcrum. That is, the laminate-type power storage element 1a according to the present embodiment can prevent the break of the electrode terminal plates (23 and 33) taking the terminal lead margin 13b as the edge.

In the laminate-type power storage element 1a illustrated in FIG. 9A to FIG. 9C, the upper laminated film 11b projects with respect to the lower laminated film 11a over the entire length of the terminal lead margin 13. However, it is only necessary that one upper or lower laminated film (11a or 11b) projects with respect to the other laminated film (11b or 11a) in the region to which the electrode terminal plates (23 and 33) in the exterior body 11 are guided.

Figure 10:
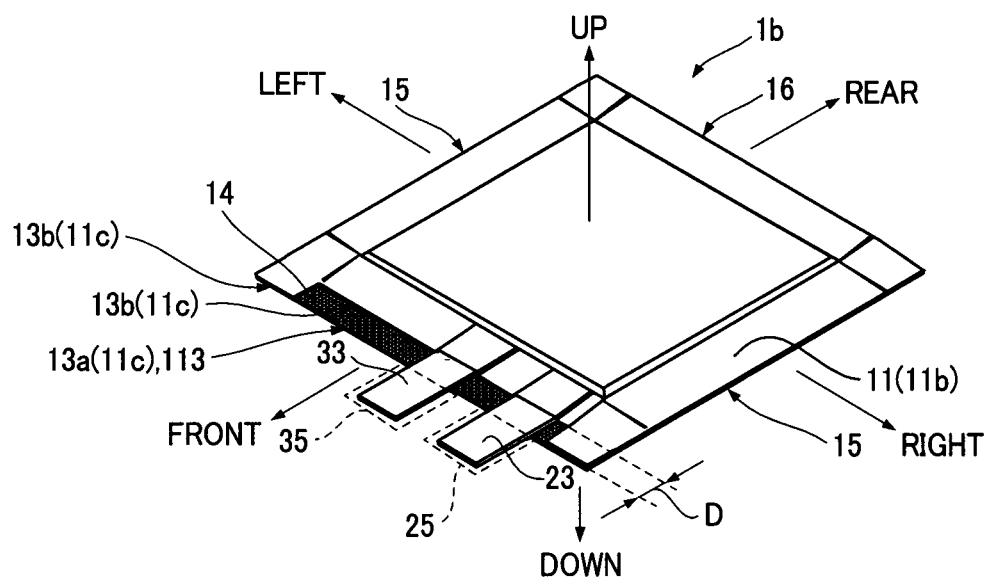
FIG. 10 is a view illustrating a modification of the laminate-type power storage element according to the second embodiment.

For example, as in a laminate-type power storage element 1b illustrated in FIG. 10, the terminal lead margin 13b of the upper laminated film 11b may be formed into a concave shape. In this laminate-type power storage element 1b, a left edge and a right edge of the terminal lead margin 13b at the upper laminated film 11b are aligned with the straight terminal lead margin 13a at the lower laminated film 11a.

Reliability Test

Next, the laminate-type power storage element 1a illustrated in FIG. 9A to FIG. 9C and the laminate-type power storage element 102 illustrated in FIG. 2A were manufactured as the samples. Then, the following bending test was performed for each sample. The electrode terminal plates (23 and 33) of the positive electrode 20 and negative electrode 30 were bent upward at an angle of 90° at the parts of the base ends (26 and 36) of the electrode terminal portions (25 and 35). Thus, the presence/absence of the short circuit between the positive electrode terminal plate 23 and the negative electrode terminal plate 33 was examined. Here, for each sample, 30 pieces of individuals were manufactured. The bending test was performed for total 60 pieces of individuals. As a result, in the sample of the laminate-type power storage element 1a according to the present embodiment, the short circuit did not occur in all the 30 pieces of individuals. On the other hand, in the sample of the laminate-type power storage element 102, the short circuit occurred in 28 pieces of individuals.

As described above, it was confirmed that the laminate-type power storage element 1a according to the present embodiment, without the protective tape, surely prevents the short circuit due to the contact between the metal foils exposed on the cutting surfaces 11c of the laminated films (11a and 11b) and the electrode terminal portions (25 and 35), and has the high reliability.

Other Working Examples

The laminate-type power storage elements (1a and 1b) according to the second embodiment are "the single-layer type" that houses the electrode body 10 including one each of the sheet-shaped positive electrode 20 and negative electrode 30 in the exterior body 11. However, the laminate-type power storage elements (1a and 1b) may be "the multilayer type" including the electrode bodies 10 for a plurality of layers.

The single-layer type power storage elements 1a and 1b each have a basic structure to achieve thinning by including only the smallest number of electrode bodies 10. Then, the laminate-type power storage elements 1a and 1b according to the present embodiment each has a structure that can prevent the short circuit using the tab films (14a and 14b) and without the protective tape, thus achieving further thinning with respect to the basic structure.

Needless to say, even for the laminate-type power storage elements 1a and 1b including the multilayer type electrode bodies 10, the cost reduction can be expected by eliminating the need of the protective tapes that insulate the cutting surfaces 11c of the laminated films (11a and 11b) and the sticking process of these protective tapes.

In the laminate-type power storage elements (1a and 1b) according to the present embodiment, the positive electrode terminal plate 23 and the negative electrode terminal plate 33 are guided from the exterior body 11 in the identical direction. However, the positive electrode terminal plate 23 and the negative electrode terminal plate 33 may be guided in opposite directions from two margins 13 opposed to one another at the exterior body 11. Needless to say, the electrode terminal plates (23 and 33) may be guided in directions that intersect with one another, such as two margins 13 adjacent to one another on the rectangular planar surface.

In the laminate-type power storage elements (1a and 1b) according to the second embodiment, the exterior body 11 having the rectangular-planar-shaped or straight terminal lead margin 13 is used in that the general-purpose strip-shaped tab film 14 can be used. However, it is not necessary that the outer shape of the exterior body 11 and the terminal lead margin 13 are rectangular or straight. The exterior body 11 may have an appropriate planar shape such as circular or polygonal. The terminal lead margin 13 may be a curved line.

In any case, it is only necessary that the electrode terminal plates (23 and 33) are guided from a predetermined region at the peripheral edge of the exterior body 11, one (11a or 11b) of the laminated films (11a and 11b) opposed to one another projects with respect to the other (11b or 11a) in this region, and the tab film 14 is disposed so as to be aligned with the outer shape of the one laminated film (11a or 11b).

The laminate-type power storage elements 1a and 1b according to the second embodiment are applicable to various kinds of storage elements (for example, a lithium secondary battery and an electric double layer capacitor), not limited to the lithium primary battery, insofar as the laminate-type power storage elements 1a and 1b each have a structure that seals the flat plate-shaped electrode body 10 into the flat-bag-shaped exterior body 11 constituted of the laminated films (11a and 11b). Needless to say, the laminate-type power storage elements 1a and 1b are applicable to a power storage element where the electrolyte is immersed in a polymer, such as a polymer battery. The laminate-type power storage elements 1a and 1b are applicable to a power storage element without electrolyte itself, such as an all-solid battery.

Figure 11:
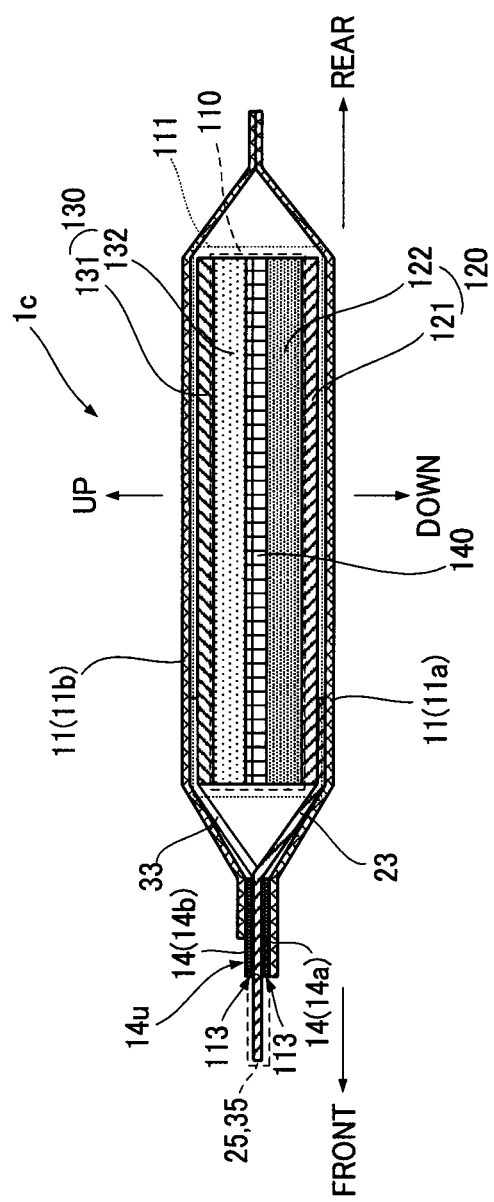
FIG. 11 is a view illustrating a laminate-type power storage element according to the second embodiment.

FIG. 11 illustrates a structure of a laminate-type power storage element 1c using an all-solid battery 111. The all-solid battery 111 housed in the exterior body 11 has a structure where current collectors (131 and 121) constituted of the metal foils are formed on a top surface and a lower surface of a laminated electrode body 110 formed by sandwiching a sheet-shaped solid electrolyte (solid electrolyte layer) 140 between a sheet-shaped positive electrode (positive electrode layer) 120 and a sheet-shaped negative electrode (negative electrode layer) 130.

The laminated electrode body 110 is an integral sintered body. A method of manufacturing the laminated electrode body 110 includes a method of sintering a formed body obtained by pressurizing raw material powder using a mold (hereinafter referred to as a compression molding method), a well-known method using a green sheet (hereinafter, a green sheet method), and similar method. In the compression molding method, powder positive electrode layer material including a positive-electrode active material and a solid electrolyte, which will be raw materials of the positive electrode layer 120, powder solid electrolyte, which will be a raw material of the solid electrolyte layer 140, and powder negative electrode layer material including a negative electrode active material and a solid electrolyte, which will be raw materials of the negative electrode layer 130 are sequentially filled in the mold with laminated shapes (sheet shapes). Next, the powder raw materials of the respective layers laminated into sheet shapes are pressurized in their laminating direction to obtain a formed body. The formed body is sintered. Accordingly, the laminated electrode body 110 constituted of the integrated sintered body is manufactured.

In the green sheet method, slurry positive electrode layer material including the positive-electrode active material and the solid electrolyte, slurry negative electrode layer material including the negative electrode active material and the solid electrolyte, and slurry solid electrolyte layer material including the solid electrolyte each are shaped into a sheet-shaped green sheet, and a laminated body formed by sandwiching the green sheet of the solid electrolyte layer material between the green sheets of the positive electrode layer material and the negative electrode layer material is sintered to manufacture the laminated electrode body 110.

Then, the all-solid battery 111 is completed by applying silver paste or by evaporating gold or the like over the top surface and the lower surface of the manufactured laminated electrode body 110 to form the current collectors (121 and 131).

Then, when this all-solid battery 111 is housed in the exterior body 11 constituted of the laminated films (11a and 11b), it is only necessary to mount the strip-shaped electrode terminal plates (23 and 33) to the current collectors (121 and 131) to guide these electrode terminal plates (23 and 33) outward from the exterior body 11.

Third Embodiment
Embodiment

Figure 12A:
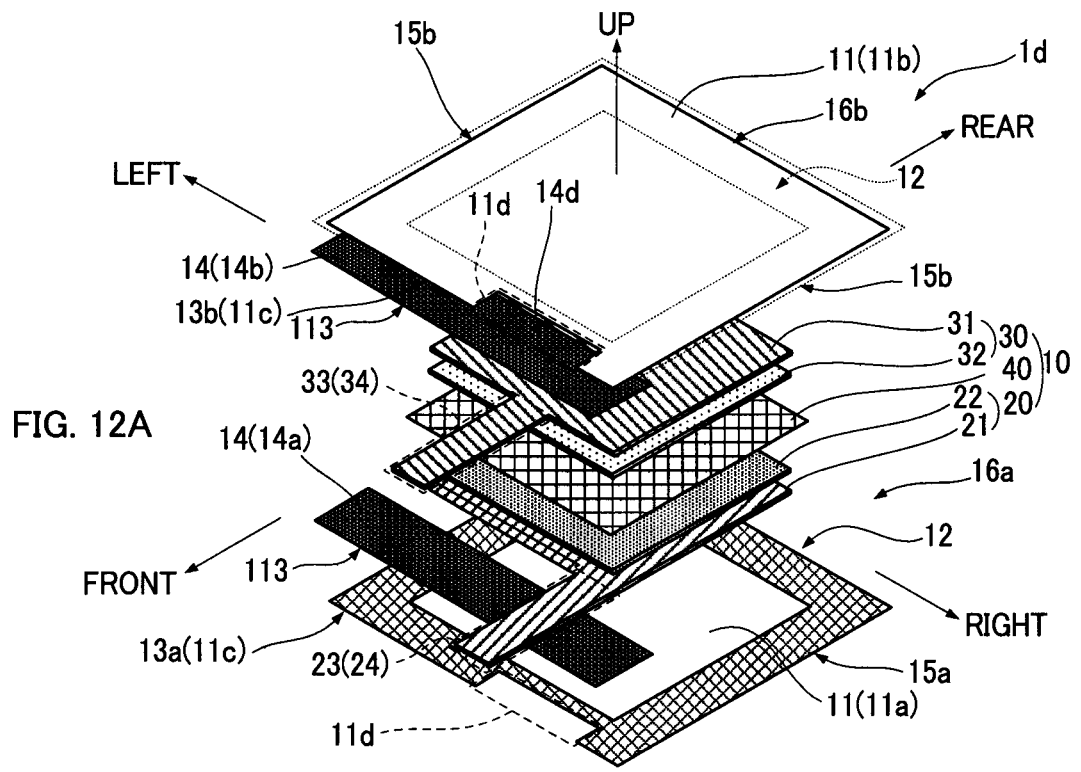
FIG. 12A is a view illustrating a laminate-type power storage element according to a third embodiment.
Figure 12B:
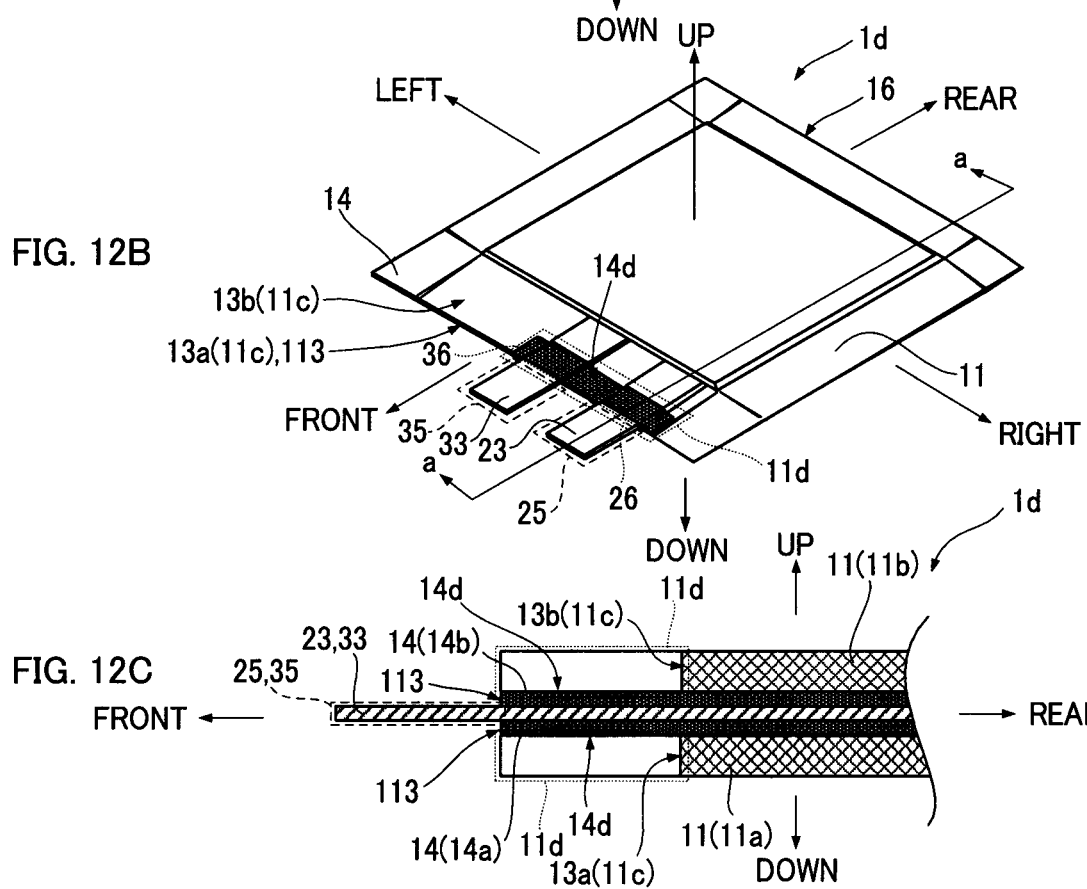
FIG. 12B is a view illustrating the laminate-type power storage element according to the third embodiment.
Figure 12C:
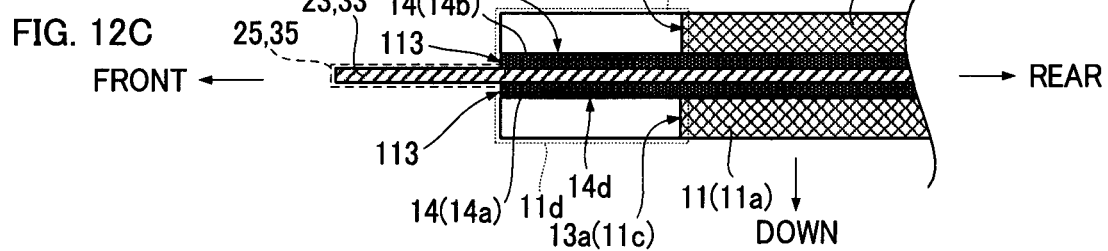
FIG. 12C is a view illustrating the laminate-type power storage element according to the third embodiment.

FIG. 12A to FIG. 12C illustrate a laminate-type power storage element 1d according to a third embodiment of the present disclosure. FIG. 12A is an exploded perspective view of the laminate-type power storage element 1d. FIG. 12B is a perspective view illustrating an appearance of the laminate-type power storage element 1d. FIG. 12C is an enlarged view of a part of a cross section viewed from an arrow a-a in FIG. 12B.

In the following description, as illustrated in FIG. 12A to FIG. 12C, in the laminate-type power storage element 1d, the thickness direction of the flat-bag-shaped exterior body 11, that is, the laminating direction of the two laminated films (11a and 11b) and the power generating elements (the positive electrode 20, the negative electrode 30, and the separator 40) in the electrode body 10 is the up-down direction, and the projecting direction of the electrode terminal plates (23 and 33) is the front-rear direction. The direction perpendicular to each of the up-down, and front-rear directions is the right-left direction. Then, in the following, with FIG. 12A and FIG. 12B taken as perspective views viewed from the upper right and the front, the respective up-down, right-left, and front-rear directions are specified.

As illustrated in FIG. 12A, at the terminal lead margins (13a and 13b) of the two laminated films (11a and 11b) that constitute the laminate-type power storage element 1d according to the third embodiment, concave portions 11d formed by notching lead regions of the electrode terminal plates (23 and 33) into rectangular shapes are formed.

Then, the outer shapes of the two laminated films (11a and 11b) are plane-symmetrical in the up and down direction. The two strip-shaped tab films (14a and 14b) have identical shapes, and sandwich the positive electrode terminal plate 23 and the negative electrode terminal plate 33 together in a state where the two strip-shaped tab films (14a and 14b) have outer shapes aligned with one another. The front margin 113 is aligned with front margins of the terminal lead margins (13a and 13b) of the upper and lower laminated films (11a and 11b). Then, after the peripheral edge regions 12 of the two laminated films (11a and 11b) are welded, the two tab films (14a and 14b) are welded to one another in a state of sandwiching the electrode terminal plates (23 and 33).

If the peripheral edge regions 12 of the two laminated films (11a and 11b) are welded, as illustrated in FIG. 12B, in the exterior body 11, the concave portions 11d are formed in a region including the regions where the electrode terminal plates (23 and 33) are guided, at the terminal lead margin 13. Then, at the tab films 14, expose surfaces 14d of front-end-side both upper and lower surfaces are exposed outward in the regions on which the above-described concave portions 11d are formed, and rear end sides are interposed between the two laminated films (11a to 11b). At the regions except for the concave portions 11d, the tab films 14 are arranged so as to be aligned with the outer shape of the exterior body 11. Accordingly, as illustrated in FIG. 12C, the electrode terminal plates (23 and 33) have top surfaces and lower surfaces covered with the tab films 14 in the regions where the above-described concave portions 11d are formed at the terminal lead margins (13a and 13b) of the two laminated films (11a and 11b). Therefore, the electrode terminal portions (25 and 35) do not contact the cutting surfaces 11c of the laminated films (11a and 11b) even if the electrode terminal portions (25 and 35) are folded on any of the upper side and the lower side.

In the laminate-type power storage element 1d according to the third embodiment, at the two laminated films (11a and 11b) that constitute the exterior body 11, it is only necessary to dispose the concave portions 11d that are plane-symmetrical in the up and down direction in the regions where the electrode terminal plates (23 and 33) are guided. This surely ensures prevention of the short circuit almost without the cost increase. Then, at both right and left ends of the terminal lead margins (13a and 13b) of the laminated films (11a and 11b), the front margins 113 of the tab films 14 do not project ahead of the exterior body 11. Therefore, the positioning accuracy when the two laminated films (11a and 11b) are laminated in the sealing process can be maintained, thus as illustrated in FIG. 5, ensuring positioning based on the outer shape of the lower laminated film 11a.

Needless to say, the base ends (26 and 36) of the electrode terminal portions (25 and 35) are covered with the tab films 14 made of resin. Thus, the electrode terminal plates (23 and 33) are not bent at the acute angle taking the terminal lead margins (13a and 13b) of the laminated films (11a and 11b) as the fulcrums. That is, the laminate-type power storage element 1d according to the third embodiment can prevent the break of the electrode terminal plates (23 and 33) taking the terminal lead margins (13a and 13b) as the edges.

In the laminate-type power storage element 1d according to the present embodiment, it is only necessary to form the concave portions 11d as encompassing the regions where the electrode terminal plates (23 and 33) are guided, at the terminal lead margins 13.

Figure 13:
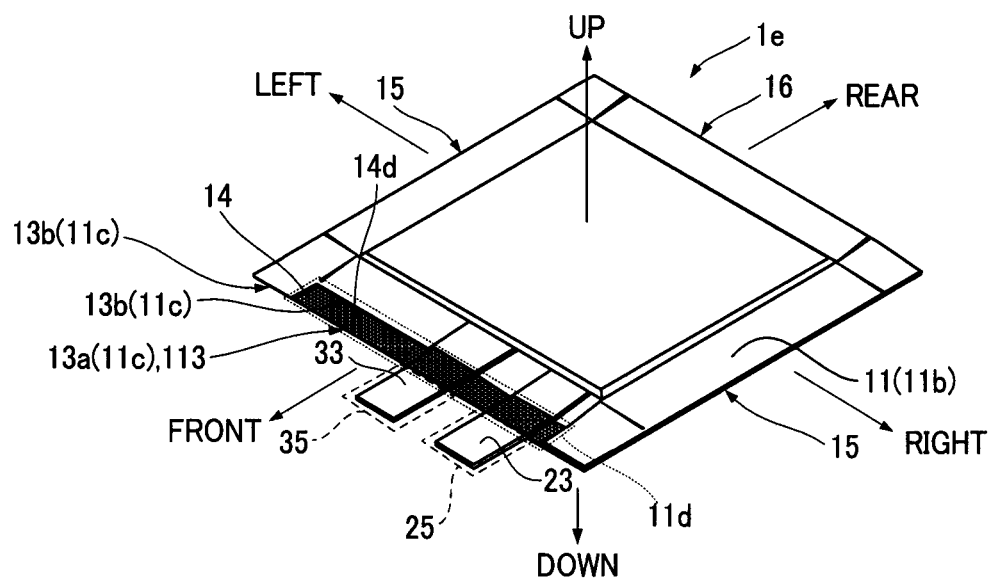
FIG. 13 is a view illustrating a modification of the laminate-type power storage element according to the third embodiment.

For example, as in a laminate-type power storage element 1e illustrated in FIG. 13, the concave portions 11d that are wide to right and left may be formed at the terminal lead margins 13. In any case, at the terminal lead margins 13, insofar as the concave portions 11d are not formed in the regions on which the positioning jig 200 illustrated in FIG. 5 abuts, positioning can be performed based on the outer shapes of the laminated films (11a and 11b).

Reliability Test

Next, the laminate-type power storage element 1d illustrated in FIG. 12A to FIG. 12C and the laminate-type power storage element 102 illustrated in FIG. 2A were manufactured as the samples. Then, the following bending test was performed for each sample. The electrode terminal plates (23 and 33) of the positive electrode 20 and the negative electrode 30 were bent upward and downward at an angle of 90° at the parts of the base ends (26 and 36) of the electrode terminal portions (25 and 35). Thus, the presence/absence of the short circuit between the positive electrode terminal plate 23 and the negative electrode terminal plate 33 was examined. Here, for each sample, 30 pieces of individuals were manufactured. The bending test was performed for total 60 pieces of individuals. As a result, in the sample of the laminate-type power storage element 1d according to the present embodiment, the short circuit did not occur in all the 30 pieces of individuals even when the electrode terminal plates (23 and 33) were bent upward and downward. On the other hand, in the sample of the laminate-type power storage element 102, the short circuit occurred in 28 pieces of individuals when the electrode terminal plates (23 and 33) were bent in any of upper and lower directions.

As described above, it was confirmed that the laminate-type power storage element 1d according to the present embodiment, without the protective tape, surely prevents the short circuit due to the contact between the metal foils exposed on the cutting surfaces 11c of the laminated films (11a and 11b) and the electrode terminal portions (25 and 35), and has the high reliability.

Other Working Examples

The laminate-type power storage elements (1d and 1e) according to the third embodiment are "the single-layer type" that houses, within the exterior body 11, the electrode body 10 including one each of the sheet-shaped positive electrode 20 and negative electrode 30. However, the laminate-type power storage elements (1d and 1e) may be "the multilayer type" including the electrode bodies 10 for a plurality of layers.

The single-layer type power storage elements 1d and 1e each have a basic structure to achieve thinning by including only the smallest number of electrode bodies 10. Then, the laminate-type power storage elements 1d and 1e according to the present embodiment each has a structure that can prevent the short circuit using the tab films (14a and 14b) and without the protective tape, thus achieving further thinning with respect to the basic structure.

Needless to say, even for the laminate-type power storage elements 1d and 1e including the multilayer type electrode bodies 10, the cost reduction can be expected by eliminating the need of the protective tapes that insulate the cutting surfaces 11c of the laminated films (11a and 11b) and the sticking process of these protective tapes.

In the laminate-type power storage elements (1d and 1e) according to the present embodiment, the positive electrode terminal plate 23 and the negative electrode terminal plate 33 are guided from the exterior body 11 in the identical direction. However, the positive electrode terminal plate 23 and the negative electrode terminal plate 33 may be guided in opposite directions from two margins 13 opposed to one another at the exterior body 11. Needless to say, the electrode terminal plates (23 and 33) may be guided in directions that intersect with one another, such as two margins 13 adjacent to one another on the rectangular planar surface.

In the laminate-type power storage elements (1d and 1e) according to the third embodiment, the exterior body 11 having the rectangular-planar-shaped or straight terminal lead margin 13 is used in that the general-purpose strip-shaped tab film 14 can be used. However, it is not necessary that the outer shape of the exterior body 11 and the terminal lead margin 13 are rectangular or straight. The exterior body 11 may have an appropriate planar shape such as circular or polygonal. The terminal lead margin 13 may be a curved line.

In any case, it is only necessary that the electrode terminal plates (23 and 33) are guided from predetermined regions at the peripheral edge of the exterior body 11, the concave portions 11d are formed in the region including the predetermined regions so that the laminated films (11a and 11b) opposed to one another are plane-symmetrical in the up and down direction, and the tab films 14 are disposed aligned with the outer shape of the exterior body 11 outside the formation regions of the concave portions 11d.

The laminate-type power storage elements 1d and 1e according to the third embodiment are applicable to various kinds of storage elements (for example, a lithium secondary battery and an electric double layer capacitor), not limited to the lithium primary battery, insofar as the laminate-type power storage elements 1d and 1e each have a structure that seals the flat plate-shaped electrode body 10 into the flat-bag-shaped exterior body 11 constituted of the laminated films (11a and 11b). Needless to say, the laminate-type power storage elements 1d and 1e are applicable to a power storage element where the electrolyte is immersed in a polymer, such as a polymer battery. The laminate-type power storage elements 1d and 1e are applicable to a power storage element without electrolyte itself, such as an all-solid battery.

Figure 14:
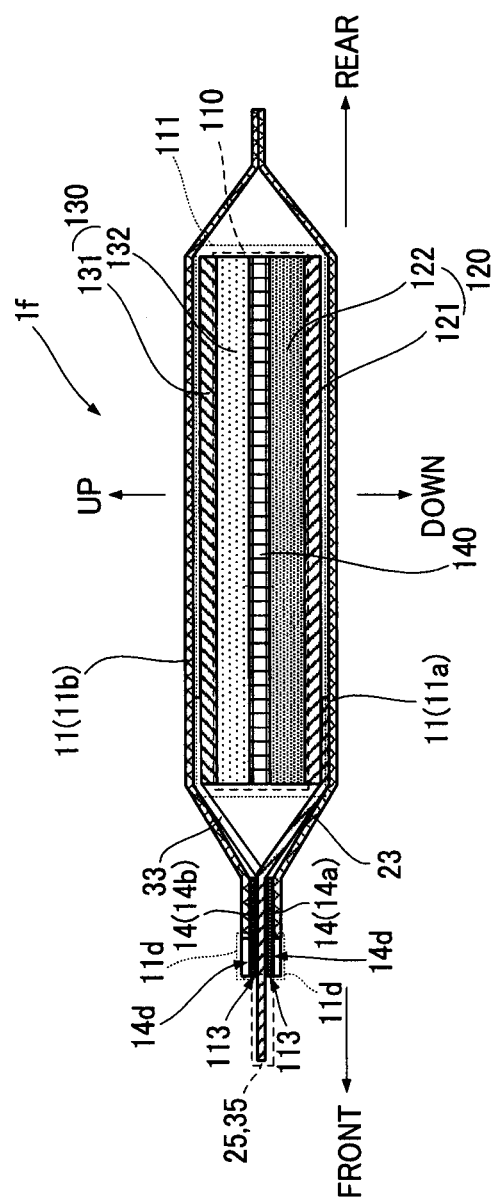
FIG. 14 is a view illustrating a laminate-type power storage element according to the third embodiment.

FIG. 14 illustrates a structure of a laminate-type power storage element 1f using the all-solid battery 111. The all-solid battery 111 housed in the exterior body 11 has a structure where the current collectors (131 and 121) constituted of the metal foils are formed on the top surface and the lower surface of the laminated electrode body 110 formed by sandwiching the sheet-shaped solid electrolyte (solid electrolyte layer) 140 between the sheet-shaped positive electrode (positive electrode layer) 120 and the sheet-shaped negative electrode (negative electrode layer) 130.

The laminated electrode body 110 is an integral sintered body. A method of manufacturing the laminated electrode body 110 includes a method of sintering a formed body obtained by pressurizing raw material powder using a mold (hereinafter referred to as a compression molding method), a well-known method using a green sheet (hereinafter, a green sheet method), and similar method. In the compression molding method, powder positive electrode layer material including a positive-electrode active material and a solid electrolyte, which will be raw materials of the positive electrode layer 120, powder solid electrolyte, which will be a raw material of the solid electrolyte layer 140, and powder negative electrode layer material including a negative electrode active material and a solid electrolyte, which will be raw materials of the negative electrode layer 130 are sequentially filled in the mold with laminated shapes (sheet shapes). Next, the powder raw materials of the respective layers laminated into sheet shapes are pressurized in their laminating direction to obtain a formed body. The formed body is sintered. Accordingly, the laminated electrode body 110 constituted of the integrated sintered body is manufactured.

In the green sheet method, slurry positive electrode layer material including the positive-electrode active material and the solid electrolyte, slurry negative electrode layer material including the negative electrode active material and the solid electrolyte, and slurry solid electrolyte layer material including the solid electrolyte each are shaped into a sheet-shaped green sheet, and a laminated body formed by sandwiching the green sheet of the solid electrolyte layer material between the green sheets of the positive electrode layer material and the negative electrode layer material is sintered to manufacture the laminated electrode body 110.

Then, the all-solid battery 111 is completed by applying silver paste or by evaporating gold or the like over the top surface and the lower surface of the manufactured laminated electrode body 110 to form the current collectors (121 and 131).

Then, when this all-solid battery 111 is housed in the exterior body 11 constituted of the laminated films (11a and 11b), it is only necessary to mount the strip-shaped electrode terminal plates (23 and 33) to the current collectors (121 and 131) to guide these electrode terminal plates (23 and 33) outward from the exterior body 11.

The laminate-type power storage element according to the present disclosure has a high reliability including a structure that achieves the cost reduction and thinning and surely ensures prevention of short circuit between the electrode terminal plates. The method of manufacturing the laminate-type power storage element according to the present disclosure ensures manufacture of the laminate-type power storage element that is inexpensive and thin, and has high reliability.

The embodiments are intended for easy understanding of the present disclosure and are not in any way to be construed as limiting the present disclosure. The present disclosure may be modified and improved without departing from the scope thereof, and equivalents thereof are also encompassed by the present disclosure.

What is claimed is:

1. A method of manufacturing a laminated power storage element, comprising:
    a tab film disposing step of disposing a tab film along a predetermined margin of a laminated film formed by forming insulating resin layers on both surfaces of a metal foil base material;
    an exterior body sealing step of disposing a pair of the laminated films so as to allow the respective tab films to oppose one another, sandwiching an electrode body between the pair of laminated films, the electrode body being constituted by laminating a sheet-shaped positive electrode coupled to a flat plate-shaped positive electrode terminal plate and a sheet-shaped negative electrode coupled to a flat plate-shaped negative electrode terminal plate via a separator, and performing thermocompression bonding on peripheral edge regions of the pair of laminated films in a state where the positive electrode terminal plate and the negative electrode terminal plate are allowed to project outside from the predetermined margin to seal the exterior body; and
    a tab film deforming step of selectively performing the thermocompression bonding on a part on which the positive electrode terminal plate and the negative electrode terminal plate are positioned in the peripheral edge regions of the pair of laminated films, deviating the pair of tab films outward from the exterior body respectively, covering an end surface of each of the pair of laminated films with the respective tab films, and covering both front and back surfaces of respective base end portions of a positive electrode terminal portion and a negative electrode terminal portion with the tab films, the positive electrode terminal portion being a part allowed to project outside the exterior body in the positive electrode terminal plate, the negative electrode terminal portion being a part allowed to project outside the exterior body in the negative electrode terminal plate,
    the exterior body sealing step and the tab film deforming step being simultaneously performed using a jig configured to perform thermocompression bonding under different conditions between a part on which the positive electrode terminal plate and the negative electrode terminal plate are positioned and another part in the peripheral edge region.

2. The method of manufacturing a laminated power storage element according to claim 1, wherein
    the tab film disposing step and the exterior body sealing step are performed using a jig configured to surround a plane region of the laminated film,
    in the tab film disposing step, positioning of respective tab films with respect to each of the pair of laminated films is performed based on an outer shape of a laminated film mounted on the jig, and
    in the exterior body sealing step, positioning of the electrode body with respect to each of the pair of laminated films and positioning of a position at which each of the pair of laminated films is thermocompression-bonded are performed based on an outer shape of the laminated film mounted on the jig.

\* \* \* \* \*